United States Patent
Chmaytelli

(10) Patent No.: US 9,148,431 B2
(45) Date of Patent: Sep. 29, 2015

(54) SYSTEMS AND METHODS FOR CALLER IDENTIFICATION CUSTOMIZATION AND REMOTE MANAGEMENT OF COMMUNICATION DEVICES

(75) Inventor: Mazen Chmaytelli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1128 days.

(21) Appl. No.: 11/609,760

(22) Filed: Dec. 12, 2006

(65) Prior Publication Data
US 2008/0137828 A1    Jun. 12, 2008

(51) Int. Cl.
*H04M 3/42* (2006.01)
*H04L 29/06* (2006.01)
*H04M 1/57* (2006.01)
*H04M 1/66* (2006.01)

(52) U.S. Cl.
CPC ............... *H04L 63/101* (2013.01); *H04M 1/57* (2013.01); *H04M 1/66* (2013.01)

(58) Field of Classification Search
CPC ........... H04M 3/42; H04M 1/56; H04M 3/16; H04M 11/10; H04M 3/42042; H04M 1/72533; H04M 1/57; H04M 3/42008; H04M 1/576; H04M 2201/40; H04M 1/271; H04Q 7/14; H04Q 7/20; H04L 29/06; H04B 1/38; G06Q 40/00; A63F 9/24; H04W 8/245; H04W 12/12
USPC ............. 455/415, 419, 420, 410; 379/142.01, 379/201.11, 207.13, 142.04, 88.02, 88.03, 379/230
See application file for complete search history.

(56) References Cited

U.S. PATENT DOCUMENTS 6,038,305 A * 3/2000 McAllister et al. ...... 379/201.02
6,351,639 B1   2/2002 Motohashi
(Continued)

FOREIGN PATENT DOCUMENTS

CN    1608369 A    4/2005
EP    1117245      7/2001
(Continued)

OTHER PUBLICATIONS

International Search Report and Written Opinion—PCT/US2007/086504, International Search Authority—European Patent Office—Jun. 20, 2008.

*Primary Examiner* — Charles Appiah
*Assistant Examiner* — Alexander Yi
(74) *Attorney, Agent, or Firm* — Fariba Yadegar-Bandari

(57) ABSTRACT

Methods, devices, systems and computer program products are described for implementing on a communication device customized caller ID and remote functional management of a communication device via shared secret exchange between calling and called parties. Customized caller ID provides for a calling party to identify themselves regardless of the device they are using to place to call. In addition, other remote functional management, such as call priority tagging, provides for the calling party to prioritize the call or otherwise customize a call ID message to the called party. By exchanging shared secrets amongst the calling and called parties, the customized caller ID method and remote functional management are secure, thereby eliminating the likelihood of unauthorized tampering by unknown parties. Shared secret exchange also provides for authorized callers to remotely access and manage the communication device, such as, for example, to remotely lock down or place the communication device in an off state.

44 Claims, 11 Drawing Sheets

(56) References Cited

U.S. PATENT DOCUMENTS

| | | |
|---|---|---|
| 6,771,755 B1 * | 8/2004 | Simpson .................. 379/142.04 |
| 7,333,496 B1 | 2/2008 | Patel et al. |
| 7,421,270 B2 * | 9/2008 | Serafat et al. ................. 455/419 |
| 7,653,383 B2 * | 1/2010 | Natarajan ..................... 455/419 |
| 2002/0077102 A1 * | 6/2002 | Achuthan et al. ............. 455/435 |
| 2002/0080942 A1 * | 6/2002 | Clapper .................. 379/201.01 |
| 2003/0013491 A1 | 1/2003 | Moriki |
| 2004/0082310 A1 | 4/2004 | Huang et al. |
| 2005/0083843 A1 | 4/2005 | Pinault |
| 2006/0122925 A1 * | 6/2006 | Wesby ............................ 705/35 |
| 2006/0189382 A1 * | 8/2006 | Muir et al. ...................... 463/29 |
| 2007/0032221 A1 * | 2/2007 | Badt .............................. 455/410 |
| 2007/0072593 A1 * | 3/2007 | Huliyapur Math ........... 455/415 |
| 2007/0101144 A1 | 5/2007 | Owen et al. |

FOREIGN PATENT DOCUMENTS

| | | |
|---|---|---|
| EP | 1750413 | 2/2007 |
| JP | 7193865 A | 7/1995 |
| JP | H0964983 A | 3/1997 |
| JP | H10177525 A | 6/1998 |
| JP | 10247984 A | 9/1998 |
| JP | 11501473 | 2/1999 |
| JP | H11331381 A | 11/1999 |
| JP | 2000134361 A | 5/2000 |
| JP | 2000316050 A | 11/2000 |
| JP | 2001008270 A | 1/2001 |
| JP | 2001268216 A | 9/2001 |
| JP | 2002064591 A | 2/2002 |
| JP | 2002218063 A | 8/2002 |
| JP | 2003032354 A | 1/2003 |
| JP | 2004112253 A | 4/2004 |
| JP | 2004194194 A | 7/2004 |
| JP | 2004207971 A | 7/2004 |
| JP | 2005026963 A | 1/2005 |
| JP | 2005184076 A | 7/2005 |
| JP | 2005328306 A | 11/2005 |
| KR | 20030047874 | 6/2003 |
| KR | 20060045365 | 5/2006 |
| KR | 20060046771 A | 5/2006 |
| KR | 20060123134 | 12/2006 |
| WO | WO9627974 | 9/1996 |
| WO | WO2006104459 | 10/2006 |

* cited by examiner

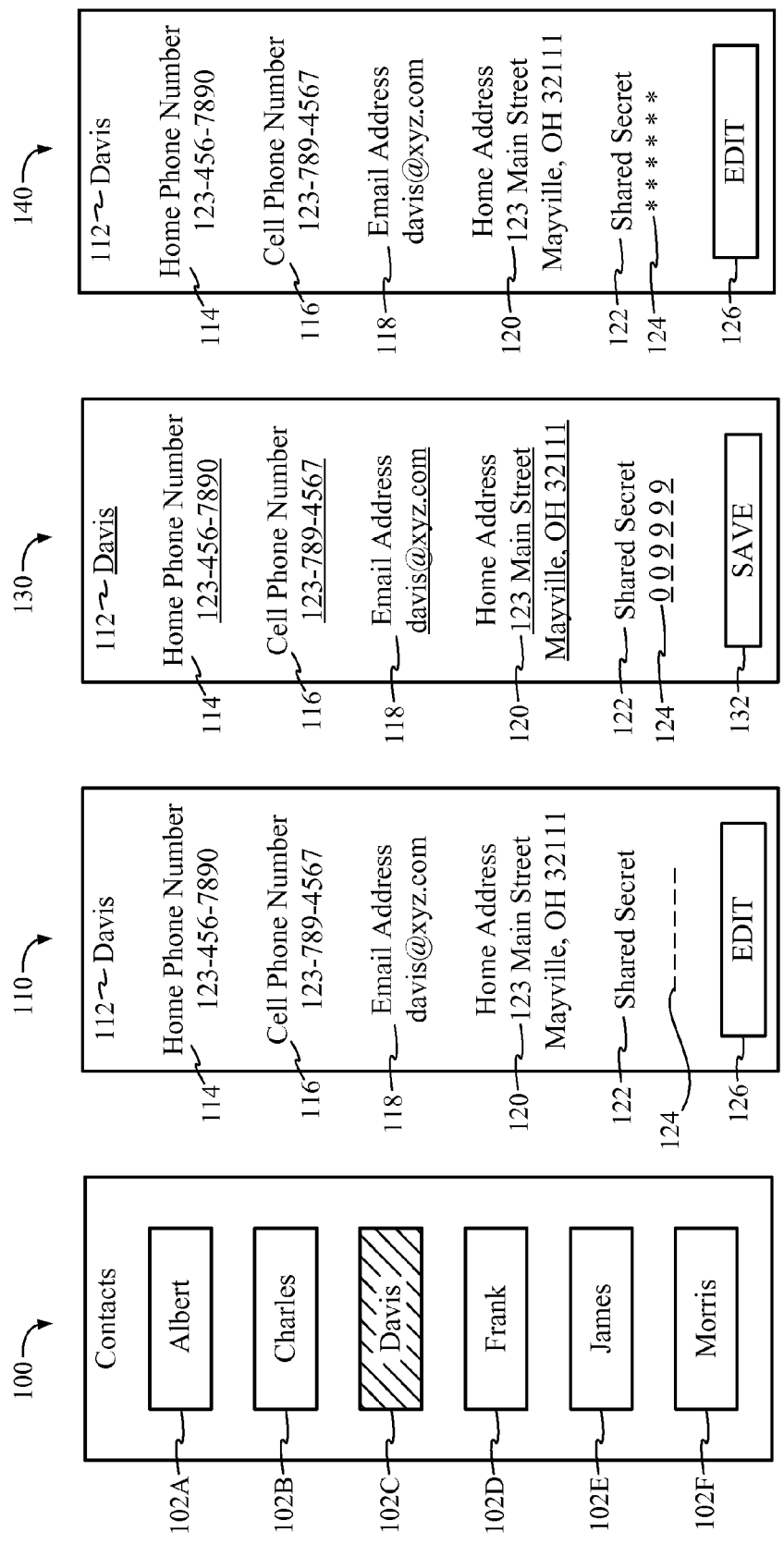

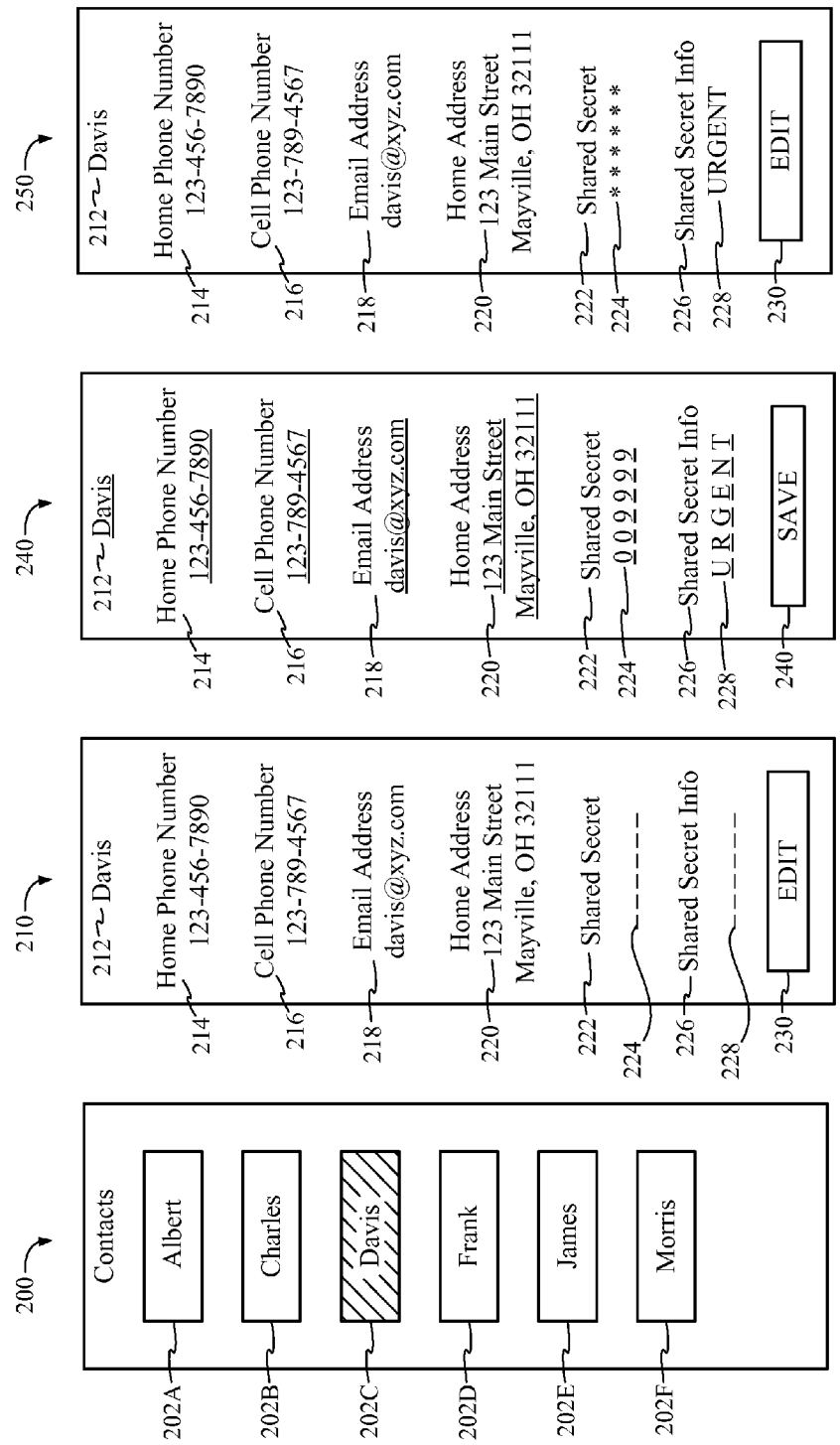

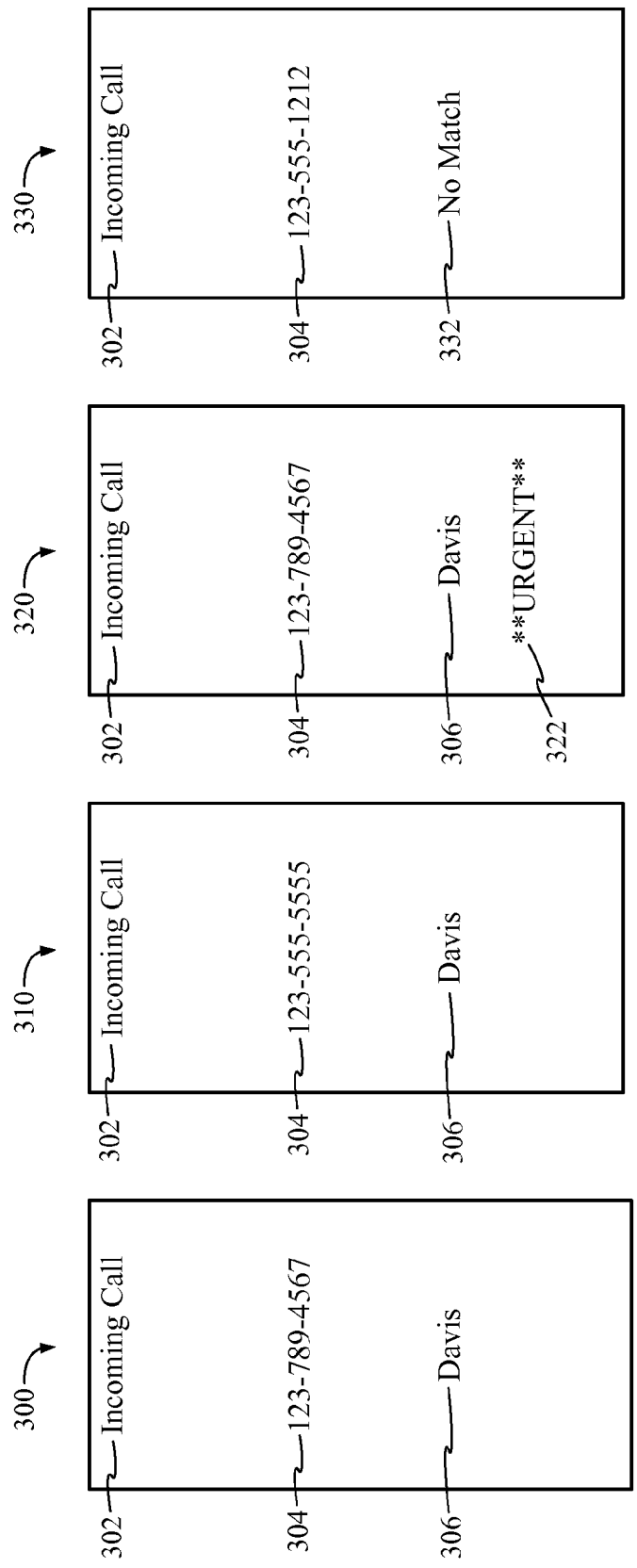

Call Request Entry Sequence Examples

350 → 1. (Called Party Telephone Number)…(Shared Secret Code)

360 → 2. (Called Party Telephone Number)…(Trigger)….(Shared Secret Code)

370 → 3. (Called Party Telephone Number)…(1st Trigger Code)..(Shared Secret Code)…(2nd Trigger Code)…(Shared Secret Code)…..(nth Trigger Code)…(Shared Secret Code)

380 → 4. (Called Party Telephone Number)…(Trigger Code)…(1st Shared Secret Code)..(2nd Shared Secret Code)….(nth Shared Secret Code)

FIG. 17

SYSTEMS AND METHODS FOR CALLER IDENTIFICATION CUSTOMIZATION AND REMOTE MANAGEMENT OF COMMUNICATION DEVICES

BACKGROUND

The described aspects relate to caller identification systems, and more particularly, to systems and methods for on demand customization of a caller identification.

Caller identification, otherwise referred to as caller ID, was first invented in the early 1980's and became widely commercially available in the 1990's. Today, caller ID is available to both wired (i.e., landline) and wireless communication devices.

In conventional caller ID, the service provider, such as a telephone company, implements a Frequency Key Shift (FSK) technique to send ASCII (American Standard Code for Information Interchange) character data intertwined with the ring signal data. A modem within the call receiving device decodes the bits in the call transmission, such as the ring signal and the caller ID information. The caller ID information may include the calling device identification number (i.e., the calling device telephone number) and, in some applications, the name of the user associated with the calling device telephone number.

In contrast, in a wireless communication device, caller ID is implemented by matching the received over the air phone number with entries in the device's phonebook or contact listings. If a match in the phonebook or contact list is found, then the name associated with the phone number is displayed on the wireless device.

However, in both the conventional caller ID service and in the wireless communication caller ID system, caller identification is limited to identifying the caller typically associated with the phone number. For example, conventional caller ID identifies the party registered with the service provider as the "owner" of the telephone number or the party associated with the telephone number within the receiving device's phone book or contact list. As such, known caller ID systems do not accommodate the situation in which the actual caller is someone other than the party registered with the service provider or the party associated with the telephone number within the receiving device's phone book or contact list.

For example, in the situation in which a telephone, wired or wireless, is borrowed by someone who needs to place a call, a wireless device receiving the call will typically display only the calling telephone number because the phone number will likely not exist in the receiving device's phone book in association with a name. Likewise, if the receiving device is a wired communication device, the caller ID function may provide for display of data that indicates the name of the party associated with the phone number, but not the name of the actual caller.

Thus, a problem arises in that the receiving party does not recognize the displayed telephone number and/or the name of the party associated with the telephone number, and therefore the receiving party may choose to ignore the call. In many instances, this problem may be exasperated when someone is borrowing a telephone to place a call, where the call is of the utmost importance and being able to immediately communicate with the called party is critical.

Additionally, current caller ID systems do not provide for prioritizing the importance of a call to insure that the receiving party answers the call. Such prioritization of communications is commonplace in other forms of communication, such as electronic mail, which uses red flags or exclamation points to signify that a message is high priority. In this regard, prioritization may be desired to highlight the importance of the communications to the recipient. In the land-line telephone hypothetical, a receiving party who is burdened during the workday with frequent calls may routinely choose to ignore such calls and opt to have the caller leave voicemail. However, if the caller is provided with a means for signaling to the receiving party that the importance of the call warrants high priority, then the receiving party may be more prone to answer the call immediately in view of such signaling.

However, in both the situation in which the calling party wishes to customize the caller ID information so as to insure that the called party knows the callers identity, and in the situation in which the calling party wishes to prioritize a call to insure that the called party answers the call, it may be desirable to insure that non-authorized callers, such as scammers, telemarketers or the like, do not have access to customizing their caller ID information or prioritizing their calls. Security in this regard may be useful to insure that scammers do not dupe the receiving party into believing that they are a known party or an important caller based on unreliable information.

Thus, a need exists for methods and systems that provide for customized caller identification. The customization aspect of the system may provide for the calling party to override the standard caller ID information associated with the calling communication device. In addition, customization may provide for the calling party to prioritize calls for the purpose of alerting the receiving party that a call has heightened importance.

SUMMARY

Systems, methods, devices and computer programs are provided that provide for customized caller ID and remote secured management of wireless devices. Present aspects utilize a shared secret between calling party and called party to allow for customized caller identification and/or remote management of the called communication device. In this regard, a caller is able to identify themself in instances in which they are using an alternate communication device (i.e., a device other than their own). Additionally, customized caller ID provides for the calling party to prioritize or otherwise present a customized message to the calling party. Shared secrets also provide for secured remote management and control of the communication device, allowing a communication device user to grant the right to remotely access the communication device and perform functions available on the device or to lock-down or place the device in an off mode.

In one aspect, a method for remote management of a communication device is defined. The method comprises receiving a communication call that includes shared secret data, verifying the shared secret; and performing a communication device function associated with the verified shared secret. The action of receiving a communication call that includes shared secret data may further be defined by the action of receiving a communication that includes a trigger and a shared secret. The action of verifying the shared secret may further be defined be the actions of referencing a predetermined database in response to receipt of the shared secret and referencing a predetermined entry in the database associated with the shared secret. In aspects in which the communication call includes a trigger and shared secret data, the action of verifying the shared secret may further be defined be the actions of referencing a predetermined database associated with the trigger and referencing a predetermined entry in the database associated with the shared secret.

The action of performing a communication device function associated with the verified shared secret may further be defined by the action of an output signal, such as a visual display or audio signal, to identify a caller associated with the shared secret. Additionally, the action of performing a communication device function associated with the verified shared secret may further be defined by the action of an output signal, such as a visual display or audio signal, to identify a priority of the call, such as high or urgent priority. Also, the action of performing a communication device function associated with the verified shared secret further may further be defined by the action of providing a caller access to one or more communication device functions or providing the caller the ability to lock the device in an off mode.

A further aspect is defined by a computer readable medium tangibly storing a sequence of instructions that, when executed, cause a computer device to perform the actions of receiving a communication call including shared secret data, verifying the shared secret and performing a communication device function based on the verification of the shared secret.

A related aspect is defined by at least one processor configured to perform the actions of receiving a communication call including shared secret data, verifying the shared secret and performing a communication device function based on the verification of the shared secret.

Another aspect of the invention includes a method for caller identification on a communication device. The method includes the actions of receiving a communication call including shared secret data, accessing a database to determine a contact associated with the shared secret; and providing an output signal that identifies the contact associated with the shared secret. The output signal may include a display of a caller identification, an audible signal or any other suitable output signal. The action of receiving a communication call including shared secret data may further be defined by the action of receiving a communication call having a trigger and a shared secret. In such aspects, the action of accessing a database to determine a contact associated with the shared secret is further defined as accessing a database associated with the trigger to determine a contact associated with the shared secret. In addition to providing an output signal to identify the contact, the shared secret data may additional provide for accessing a database to determine communication priority associated with the shared secret data and providing an output signal, such as a display of call priority or an audio signal, which identifies the communication priority associated with the shared secret.

A further aspect is provided by a communication device that includes a personal information manager that includes one or more databases that associate shared secrets with shared secret information. The communication device further includes a call manager module that includes shared secret recognition logic operable to recognize a shared secret in a communication call and access the contact database to determine shared secret information associated with the shared secret and shared secret function logic operable for performing a communication device function based on at least one of the shared secret and shared secret information. The shared secret function logic may be defined by caller identification logic operable to identify a caller associated with the shared secret and to provide an output signal, such as a visual display or audio signal, which identifies the caller. In other aspects in the shared secret function logic may be defined by call priority logic operable to identify a priority of the communication call based on a shared secret and provide an output signal, such as a visual display or audio signal, which identifies the priority of the call. Additionally, the shared secret function logic may be defined by communication device management logic operable to provide caller access to communication device functionality based on the shared secret. Alternatively, the shared secret function logic may be defined by communication device lock-down logic operable to lock down the communication device based on the shared secret.

In yet another aspect, a communication device is provided that includes a contact database that associates a contact with a shared secret. The communication device further includes a call manager module including shared secret recognition logic operable to recognize a shared secret in a communication call and access the contact database to determine a contact associated with the shared secret and caller identification logic operable to provide an output signal, such as a visual display or an audio signal, which identifies the contact associated with the shared secret as the calling party and provide an output signal that identifies the contact as the caller. Additionally, the call manager module may include call priority logic operable to provide an output signal, such as a visual display or audio signal, which identifies a call priority based on the shared secret.

Further aspects are defined in terms of a network device, such as a server residing at a base station or the like. In one aspect a method for providing remote access to a communication device via a network device is defined. The method includes receiving, at a network device, a communication call request including a calling device identification number and a shared secret; and communicating a call request to a called party that includes the calling device identification number and the shared secret. The method also may include providing for receiving a trigger, in addition to the calling device identification number and shared secret and communicating the trigger along with the call request to the called party.

A related aspect is defined by a computer readable medium tangibly storing a sequence of instructions that, when executed, cause a computer device to perform the actions of receiving, at a network device, a communication call request including a calling device identification number and a shared secret and communicating a call request to a called party that includes the calling device identification number and the shared secret.

A further related aspect is defined by at least one processor configured to perform the actions of receiving, at a network device, a communication call request including a calling device identification number and a shared secret and communicating a call request to a called party that includes the calling device identification number and the shared secret.

Another aspect is provided by a network device, such as a server residing at a base station or the like. The device includes a shared secret forwarding module that includes shared secret recognition logic operable for recognizing a shared secret in a communication call request and shared secret forwarding logic operable to communicate the shared secret to a called party associated with the communication call request.

Thus, the describe aspects provide methods, devices, systems and computer program products for customizing caller ID or performing remote management of device functionality by implementing shared secret exchange between calling and called parties. Customized caller ID provides for a calling party to identify themselves regardless of the device they are using to place to call. In addition, another function, such as call priority tagging provides for the calling party to prioritize the call or otherwise customize a call identification message to the called party. By exchanging shared secrets amongst the calling and called parties the customized caller ID and remote functional management method is secure; eliminating the likelihood of unauthorized tampering by unknown parties. Shared secret exchange also provides for authorized callers to remotely access and manage the communication device, such as, for example remotely locking down the communication device in an off state.

BRIEF DESCRIPTION OF THE DRAWINGS

The disclosed aspects will hereinafter be described in conjunction with the appended drawings, provided to illustrate and not to limit the disclosed aspects, wherein like designations denote the elements, an in which:

FIGS. 5-8 are examples of a display of a graphical user interface highlighting the procedure for entering shared secrets into a contact or phone book database;

FIG. 9-12 are examples of a display of a graphical user interface highlighting the procedure for entering shared secrets and related shared secret information, such as call priority, into a contact or phone book database;

FIG. 13 is a display of a graphical user interface highlighting a caller ID mode in which the caller is placing the call from their own communication device;

FIG. 14 is a display of a graphical user interface highlighting a customized caller ID mode in which the caller is placing the call from a communication device other than their own;

FIG. 15 is a display of a graphical user interface highlighting a customized caller ID mode in which the caller is placing a priority identification on the call;

FIG. 16 is a display of a graphical user interface highlighting a customized caller ID mode in which the communication device is unable to match the shared secret found in the call request;

FIG. 17 provides examples of call entry sequences utilizing triggers and shared secret codes to execute customized caller ID and/or remote communication device access;

DETAILED DESCRIPTION

The present devices, apparatus, methods, computer-readable media and processors are described with reference to the accompanying drawings, in which aspects of the invention are shown. The devices, apparatus, methods, computer-readable media and processors may, however, be embodied in many different forms and should not be construed as limited to the aspects set forth herein; rather, these aspects are provided so that this disclosure will be thorough and complete, and will fully convey the scope of the invention to those skilled in the art. Further, in this description, like numbers refer to like elements throughout.

The present devices, apparatus, methods, computer-readable media and processors provide for customized caller identification (i.e., caller ID) and secured remote access and management of communication devices. Present aspects utilize a shared secret between calling party and called party to allow for customized caller identification and/or remote access or management of the called communication device. In this regard, a caller is able to identify themself in instances in which they are using an alternate communication device (i.e., a device other than their own). Additionally, customized caller ID provides for the calling party to prioritize or otherwise present a customized message to the calling party. Shared secrets also provide for secured remote management and control of the communication device, allowing a communication device user to grant the right to remotely access the communication device and perform functions available on the device or to lock-down or place the device in an off mode.

Figure 1:
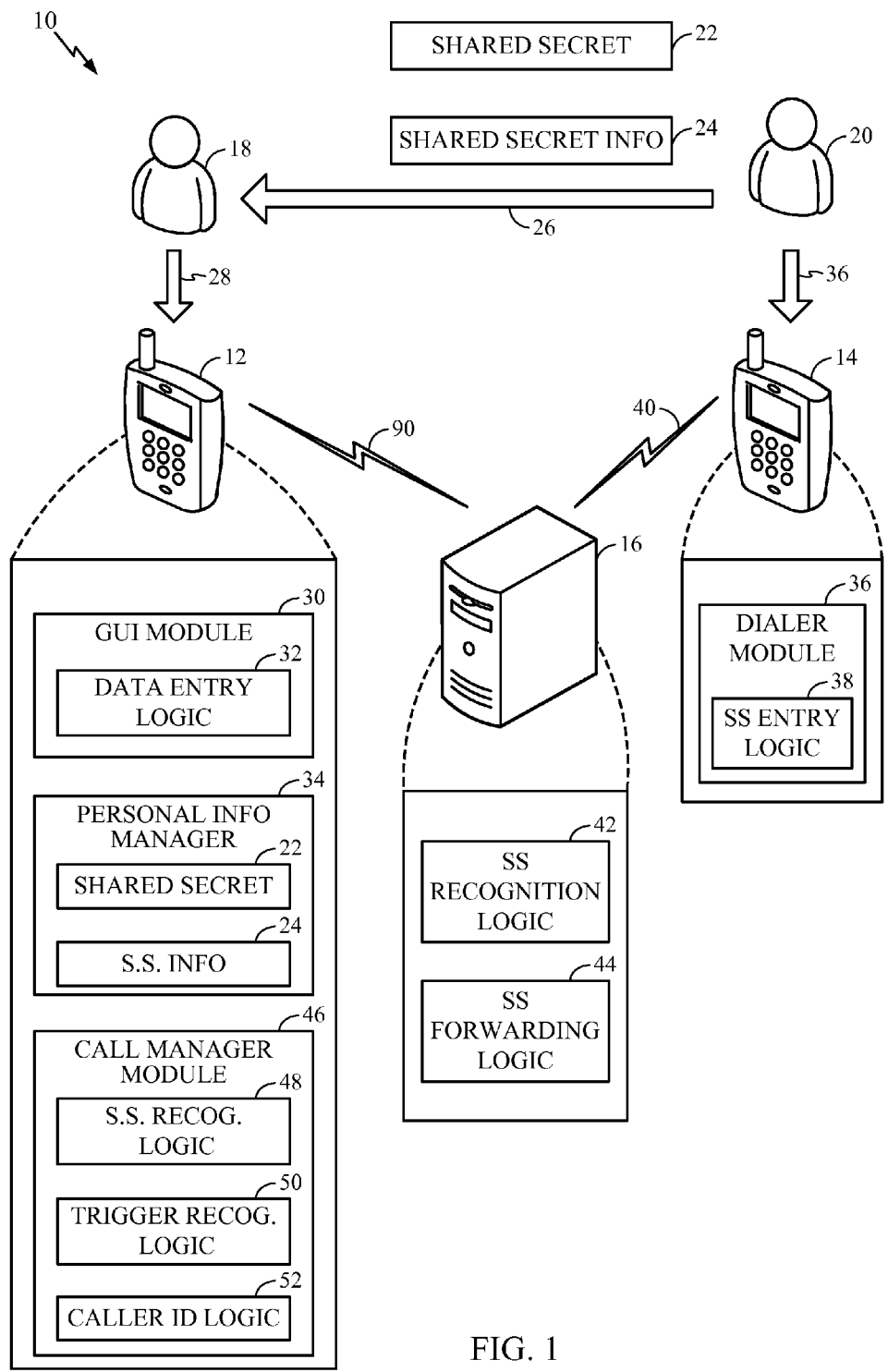
FIG. 1 is a schematic diagram of one aspect of a communication device-based system for providing customized caller identification and/or remote communication device access.

Referring to FIG. 1, according to one aspect, a system 10 for customized caller ID and/or remote access and management of communication devices is depicted. It should be noted that the customized caller ID, secured remote access and communication device management functionality of the present aspects herein described may reside at the called communication device level, the network device level or any combination of the called device and the network device. In the illustrated aspect of FIG. 1 the functionality, in terms of recognizing the shared secret and associating it with an entry in a database, resides at the called device level. The system includes a first communication device 12, which in this example serves as the called communication device, a second communication device 14, which in this example serves as the calling communication device and a network device 16, such as server device residing at a base station within the communication network. In the illustrated aspect the communication devices are wireless devices, however; in other aspects one or more of the communication devices may be wired communication devices, such as landline telephones or the like and the network device may be a component within a landline network.

System 10 allows for a first user 18 and a second user 20 to customize caller ID and/or call priority information, as well as allowing for remote access and management of communication devices. The first user 18 is associated with the first communication device 12, such that the first user is the owner or typical possessor of the first communication device. Further, the second user 20 is not associated with the second communication device 14, such that the second user is a borrower or secondary possessor of the second communication device (i.e., the second communication device is not the device typically possessed by the second user). The second user 20 will create a shared secret 22 and communicate the shared secret and any related shared secret information 24 to the first user 18. The communication of the shared secret 22 and any related shared secret information 24 is represented by arrow 26 in FIG. 1

The shared secret 22 may take the form of any data that may be recognizable by the first communication device 20. In many aspects, the shared secret will be a numeric code, such as a two or more digit numeric code. In other aspects, the shared secret may be a visual data, such as an image, an audio data, such as a ring tone signal, biometric data, such as fingerprint data, voice data or the like. Related shared secret information 24 may include data associated with the shared secret, such as a priority data, in the form of a visual message to be displayed or an audio signal to be generated or the additional shared secret information may include instructions for remotely accessing and/or managing the communication device based on the exchange of the shared secret.

The second user 20 will communicate (arrow 26) the shared secret 22 and any related shared secret information 24 to the first user 18 by any acceptable means of communication, such as electronic communication, in-person communication, or the like. Typically, the chosen means of shared secret communication will provide for the requisite level of communication security to insure that the shared secret 22 is not shared or otherwise comes into the possession of unauthorized users. In this regard, electronic communication may utilize encryption or some other form of secured communication to insure that the shared secret 22 remains confidential.

Upon receipt of the shared secret, the first user 18 will input the shared secret 22 and any related shared secret information 24 into the first communication device 12. The inputting of the shared secret 22 and any related shared secret information 24 into the first communication device is represented by arrow 28 in FIG. 1. In one aspect, a Graphical User Interface (GUI) module 30 is executed on the first communication device 12 and includes data entry logic 32 operable for entering the shared secret and any related shared secret information into device storage, such as personal information manager 34, which may include a personal phonebook, contact database or the like, such that the shared secret and any related shared secret information is associated with second user 20 in the contact database, phone book database or the like. The second user 20 may have a preexisting entry in the first communication device contact storage or phone book storage, or it may be necessary to create a new contact entry for the second user 20 that will include the shared secret and any related shared secret information. FIGS. 5-8, which illustrate examples of a display of a GUI highlighting the procedure for entering shared secrets into a contact or phone book database, will be discussed in detail infra. FIGS. 8-11, which illustrate examples of a display of GUI highlighting procedure for entering additional shared secret information into a contact or phone book database will also be discussed in detail infra.

In alternate aspects in which the shared secret 22 and any related shared secret information 24 is communicated electronically from the second user 20 to the first communication device 12, the first communication device may be configured to automatically recognize the shared secret and related information, automatically associate the shared secret with the user sending the secret and automatically store the shared secret in the corresponding entry within the contact or phone book database associated with the user sending the shared secret. In such aspects, the need to have the first user manually input the shared secret and any related shared secret information may be obviated.

Once the shared secret has been stored within the first communication device 12, the second user 20 may borrow or otherwise use the second communication device 14 to call the first communication device 12. As previously discussed, the second communication device is not the device typically used by or associated with the second user 20. As such, in typical caller ID systems, the receipt of a call from second communication device 14 by first communication device 12 would typically result in either no caller ID information being displayed, or with the phone number and/or name of the actual owner of the second communication device 14, who may not be known by the owner of the first communication device 12, being displayed. The use of the second communication device 14 by the second user is represented by arrow 36 in FIG. 1. The second communication device 14 may include a dialer module 38 that is operable to input a telephone number to place a call request. In some aspects, the dialer module 34 may include shared secret entry logic 36 that is operable for entering a shared secret 22 or otherwise attaching a shared secret to the call request. In one aspect, the shared secret entry logic 38 is operable such that the entry of a trigger command, after entry of the called party telephone number, provides for the entry of a shared secret. For example, the "*" key and an accompanying numeric code may serve as the trigger and a shared secret 22, in the form of a numeric code, may be entered after input of the trigger. FIG. 17 provides examples of call request entry sequences and will be discussed in detail infra. It should be noted, however, that shared secret entry logic 38 may not be required, such as in the case where the combination of the entered phone number, one or more shared secret trigger commands, and one or more shared secrets is within a predetermined number of digits recognized by the communication network in use.

Once the call request, which includes the dialed telephone number and the shared secret 22, is communicated to the base station, the request is received by a network device 16, such as a server or the like. The communication of the call request from the second communication device 14 to the network device 16 is represented by wireless communication bolt 40. The network device 16 may include shared secret recognition logic 42 operable for recognizing a shared secret in the call request and parsing the payload that includes the shared secret 22. In aspects in which the call request includes a trigger and a shared secret 22, the shared secret recognition logic 42 may be configured to recognize the trigger and parse the payload that includes the trigger and shared secret. The network device also may include shared secret forwarding logic 44 that is operable for forwarding the parsed payload including the shared secret, and optional trigger, to the called party. It should be noted, however, that shared secret recognition logic 42 and/or shared secret forwarding logic 44 may not be required, such as in the case where the combination of the entered phone number, one or more shared secret trigger commands, and one or more shared secrets is within a predetermined number of digits recognized and forwarded by the communication network in use and/or the network device 16.

The network device 16 forwards the call request, shared secret and, in some aspects, a trigger to the first communication device 12. The call manager module 46 is operable to receive the call request, and shared secret recognition logic 48 may be operable to recognize the shared secret, verify the existence of the shared secret in device database, such as the shared secret database 22 in personal information manager 34 and, upon verification, perform the function or execute the application related to the shared secret. In some aspects, in addition to shared secret recognition logic 48, the call manager module 46 may include trigger recognition logic 50 that is operable to recognize a trigger as an indicator that a shared secret is forthcoming in the call request. In some aspects the trigger may indicate the function or application that relates to the shared secret. In this regard, the trigger recognition may provide information as to which databases are associated with the forthcoming shared secret for the purpose of verification and instructions on functionality and/or execution related to the shared secret.

In one aspect in which the use of shared secrets provide for customized caller identification, the call control manager may include caller identification (ID) logic 52 operable to recognize the caller's identification by displaying on a device display the telephone number and/or name associated with the calling device. In this aspect, the shared secret recognition logic 48, and, optionally, the trigger recognition logic 50, may be operable to recognize a shared secret and, optionally, recognize a trigger, such that the caller ID logic 52 is overridden from displaying the telephone number and/or name associated with the calling device. Instead, the shared secret recognition logic 48 verifies the shared secret in the shared secret database 22 of the personal information manager 34 and communicates the personal information associated with the shared secret, such as name, telephone number or other identification to the caller ID logic 52 for display, or directly displays this information. In this regard, this aspect provides for the display of the identification of the "actual" caller, based on the shared secret, rather than the display of the identification of the calling device's owner.

Figure 2:
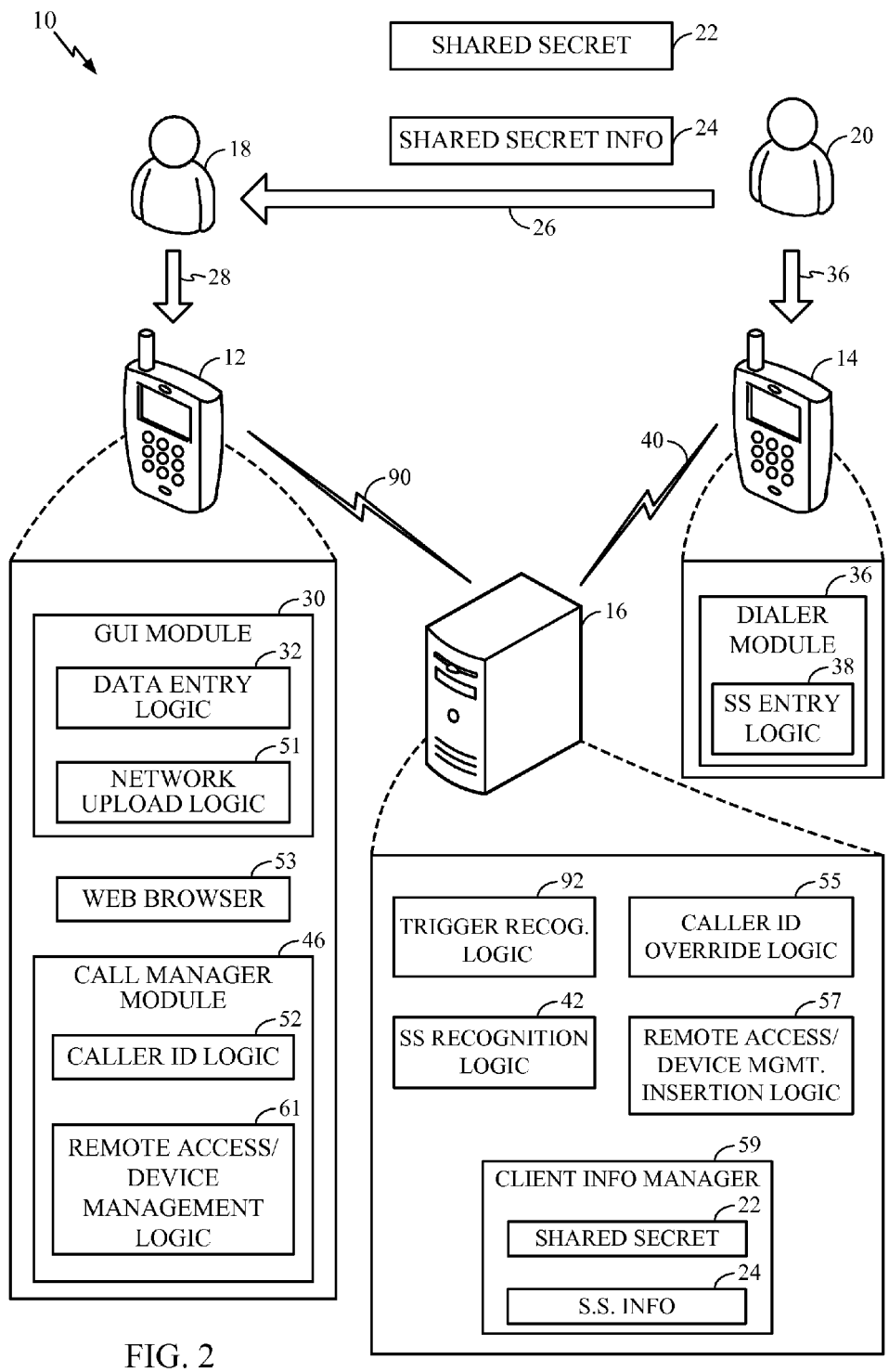
FIG. 2 is a schematic diagram of one aspect of a network-based system for providing customized caller identification and/or remote communication device access.

Referring to FIG. 2, according to an alternate aspect, a system 10 for customized caller ID and/or remote access and management of communication devices is depicted. In the illustrated aspect of FIG. 2 the functionality, in terms of recognizing the shared secret and associating it with an entry in a database, resides at the network device level. The system includes a first communication device 12, which in this example serves as the called communication device, a second communication device 14, which in this example serves as the calling communication device and a network device 16, such as server device residing at a base station within the communication network. Similar to FIG. 1, in the illustrated aspect of FIG. 2 the communication devices are wireless devices, however; in other aspects one or more of the communication devices may be wired communication devices, such as landline telephones or the like and the network device may be a component within a landline network.

System 10 allows for a first user 18 and a second user 20 to customize caller ID and/or call priority information, as well as allowing for remote access and management of communication devices. The first user 18 is associated with the first communication device 12, such that the first user is the owner or typical possessor of the first communication device. Further, the second user 20 is not associated with the second communication device 14, such that the second user is a borrower or secondary possessor of the second communication device (i.e., the second communication device is not the device typically possessed by the second user). The second user 20 will create a shared secret 22 and communicate the shared secret and any related shared secret information 24 directly to the network device 16 and/or to the first user 18, for subsequent communication to the network device 16. Communication of the shared secret 22 and any related shared secret information 24 directly to the network device 16 from the second user 20 is represented by arrow 36 (input into second communication device 14) and wireless communication bolt 40 (electronic communication from the second communication device 14 to the network device 16). Alternatively, communication of the shared secret 22 and any related shared secret information 24 from the second user to the first user is represented by arrow 26 in FIG. 2.

The second user 20 may communicate (represented by arrow 26) the shared secret 22 and any related shared secret information 24 to the first user 18 by any acceptable means of communication, such as electronic communication, in-person communication, or the like. In addition, the second user 20 may communicate (represented by arrow 36 and bolt 40) the shared secret 22 and any related shared secret information 24 to the network device 14 by any acceptable means of communication, such as electronic communication, in-person communication, or the like. Typically, the chosen means of shared secret communication will provide for the requisite level of communication security to insure that the shared secret 22 is not shared or otherwise comes into the possession of unauthorized users. In this regard, electronic communication may utilize encryption or some other form of secured communication to insure that the shared secret 22 remains confidential.

In aspects in which the second user 20 communicates the shared secret 22 and any additional shared secret information 24 directly to the network device 14, the need to send the shared secret and any related information to the first user 18 may be obviated. In such aspects in which the second user 20 communicates the shared secret 22 and any related shared secret information directly to the network device 14, without communication to the first user 18, customized caller ID, remote access and/or communication device management may be conducted without knowledge of the first user 18.

However, in those aspects in which the shared secret 22 and any related shared secret information 24 are communicated to the first user 18 and subsequently communicated to the network device 14, the first user 18 inputs the shared secret 22 and any related shared secret information 24 into the first communication device 12 for subsequent communication to the network device 14. The inputting of the shared secret 22 and any related shared secret information 24 into the first communication device is represented by arrow 28 in FIG. 1. In one aspect, a Graphical User Interface (GUI) module 30 is executed on the first communication device 12 and includes data entry logic 32 operable for entering the shared secret and any related shared secret information and, optionally, storing the shared secret and related information locally. The GUI module 30 may also include network upload logic 51 operable for uploading or otherwise communicating the shared secret 22 and any related shared secret information 24 to the network device 14. In an alternate aspect, the first communication device may include a web browser application 53 that allows the first user 18 to access a web page associated with the network device 14, enter the shared secret 22 and any related shared secret information 24 and, subsequently, communicate the shared secret and related information across the Internet to the network device 14.

In alternate aspects in which the shared secret 22 and any related shared secret information 24 is communicated electronically from the second user 20 to the first communication device 12, the first communication device may be configured to automatically recognize the shared secret and related information, and automatically upload or otherwise communicate the shared secret 22 and any related shared secret information to the network device 14. In such aspects, the need to have the first user manually input the shared secret and any related shared secret information may be obviated.

Once the shared secret has been stored within the network device 14, the second user 20 may borrow or otherwise use the second communication device 14 to call the first communication device 12. As previously discussed, the second communication device is not the device typically used by or associated with the second user 20. The second communication device 14 may include a dialer module 38 that is operable to input a telephone number to place a call request. In some aspects, the dialer module 34 may include shared secret entry logic 36 that is operable for entering a shared secret 22 or otherwise attaching a shared secret to the call request. In one aspect, the shared secret entry logic 38 is operable such that the entry of a trigger command, after entry of the called party telephone number, provides for the entry of a shared secret. For example, the "*" key and an accompanying numeric code may serve as the trigger and a shared secret 22, in the form of a numeric code, may be entered after input of the trigger. FIG. 17 provides examples of call request entry sequences and will be discussed in detail infra. It should be noted, however, that shared secret entry logic 38 may not be required, such as in the case where the combination of the entered phone number, one or more shared secret trigger commands, and one or more shared secrets is within a predetermined number of digits recognized by the communication network in use.

Once the call request, which includes the dialed telephone number and the shared secret 22, is communicated to the base station, the request is received by a network device 16, such as a server or the like. The communication of the call request from the second communication device 14 to the network device 16 is represented by wireless communication bolt 40. The network device may also include shared secret recognition logic 42 that may be operable to recognize the shared secret, verify the existence of the shared secret in a network database, such as the shared secret 22 in client information manager 59 and, upon verification, perform the function or execute the application related to the shared secret. The client information manager is a database stored within the network device or stored at any other network location that is accessible to the network device. The client information manager is database of client/user information and may specifically include shared secret 22 and any related shared secret information 24 associated with a client/user. In aspects in which a trigger is included in the call request, the network device 16 may also include may include trigger recognition logic 92 that is operable to recognize a trigger as an indicator that a shared secret is forthcoming in the call request. In some aspects the trigger may indicate the function or application that relates to the shared secret. In this regard, the trigger recognition may provide information as to which databases are associated with the forthcoming shared secret for the purpose of verification and instructions on functionality and/or execution related to the shared secret.

In certain aspects, in which the function related to the shared secret is customized caller ID, the verification of the shared secret 22 within the client information manager 59 will invoke the caller ID override logic 55 that is operable to replace, in the payload of the call request, the calling device (i.e., second communication device 14) caller ID information with caller ID information associated with the shared secret owner (i.e., the actual calling party). In this regard, the call request that is subsequently forwarded to the celled device, i.e., first communication device 12 will include the telephone number associated with the second communication device and the caller ID information associated with the second user 20 (i.e., the owner of the shared secret). As such, this aspect provides for the display of the identification of the "actual" caller, based on the shared secret, rather than the display of the identification of the calling device's owner.

In alternate aspects, in which the function related to the shared secret pertains to remote access, communication device management or the like the network device may include additional shared secret related insertion logic 57 operable for inserting within the call request payload identification and/or instructions for remote access, communication device management or the like. In certain aspects, the insertion logic 57 may insert an identification, such as code, within the payload that will be recognizable by the first communication device 12 (i.e., the called party) and associated with the requisite remote access, communication device management or the like. In alternate aspects, the insertion logic 57 may insert instructions, such as a routine, applications, applet or the like, within the payload that will be executed by the first communication device 12 to perform the requisite remote access, communication device management or the like.

The network device 16 forwards, to the first communication device 12, the call request, the caller ID information associated with the calling party and/or remote access/communication device management identification or instructions. The call manager module 46 is operable to receive the call request and the caller ID logic 52 is operable to display or otherwise provide to the user the caller ID information included in the call request. In this aspect, the call request may include the telephone number of the second communication device 14 and the caller ID information associated with the second user 20 (i.e., the user associated with the shared secret 22. The call manager module 46 may additionally include remote access/device management logic 61 operable to recognize a remote access/device management code in the call request and perform a function associated with the code. Alternatively, the remote access/device management logic 61 may be operable to execute instructions in the call request to perform requisite remote access/device management functions.

Figure 3:
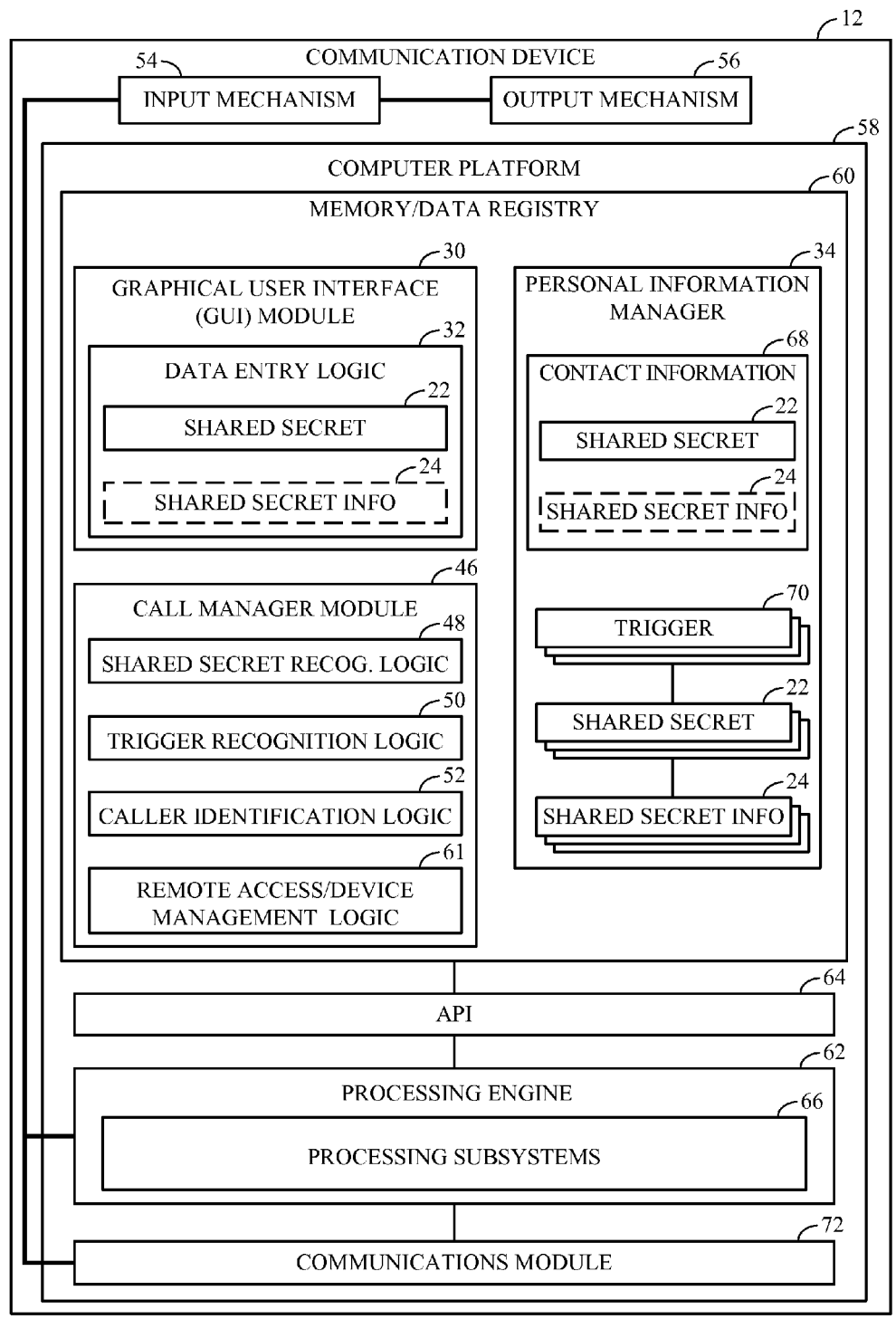
FIG. 3 is a block diagram of one aspect of a communication device for providing customized caller identification and/or remote communication device access.

Referring to FIG. 3, according to one aspect, a block diagram representation of a communication device, such as first communication device 12 is depicted. The communication device depicted is a wireless communication device, such as any type of computerized, wireless device, for example a cellular telephone, a Personal Digital Assistant (PDA), a two-way text pager, a portable computer, and even a separate computer platform that has a wireless communications portal, and which also may have a wired connection to a network or the Internet. The wireless device can be a remote-slave, or other device that does not have an end-user thereof but simply communicates data across a wireless or wired network, such as remote sensors, diagnostic tools, data relays, and the like. In alternate aspects, the communication device 12 may be a wired communication device, such as a landline telephone, personal computer, set-top box or the like. The apparatus and method for customized caller identification and/or remote device management can accordingly be performed on any form of wired or wireless device or computer module, including a wired or wireless communication portal, including without limitation, wireless modems, PCMCIA cards, access terminals, personal computers, telephones, or any combination or sub-combination thereof.

Additionally, communication device 12 has input mechanism 54 for generating inputs into wireless device, and output mechanism 56 for generating information for consumption by the user of the wireless device. For example, input mechanism 54 may include a mechanism such as a keypad or keyboard, a mouse, a touch-screen display, a microphone in association with a voice recognition module, etc. In certain aspects, the input mechanisms 54 provide for user input to activate the graphical user interface module 30 and input shared secrets into device memory. Further, for example, output mechanism 56 may include a display, an audio speaker, a haptic feedback mechanism, etc. The output mechanisms, such as a display, may be implemented in those aspects in which customized caller IDs are communicated to the device user, typically via a display or audio speaker.

Further, communication device 12 has computer platform 58 that can transmit data across wireless network or, in some aspects, a wired network, and that can receive and execute routines and applications and display data transmitted from network device 16, such as a server or another computer device connected to a wireless or wired. Computer platform 58 includes a data registry 60, which may comprise volatile and nonvolatile memory such as read-only and/or random-access memory (RAM and ROM), EPROM, EEPROM, flash cards, or any memory common to computer platforms. Further, data registry 60 may include one or more flash memory cells, or may be any secondary or tertiary storage device, such as magnetic media, optical media, tape, or soft or hard disk.

Further, computer platform 58 also includes a processing engine 62, which may be an application-specific integrated circuit ("ASIC"), or other chipset, processor, logic circuit, or other data processing device. Processing engine 62 or other processor such as ASIC may execute an application programming interface ("API") layer 64 that interfaces with any resident programs, such as GUI module 30 and/or call manager module 46, in a data registry 60 of communication device 12. API 64 is typically a runtime environment executing on the respective wireless device. One such runtime environment is Binary Runtime Environment for Wireless® (BREW®) software developed by Qualcomm, Inc., of San Diego, Calif. Other runtime environments may be utilized that, for example, operate to control the execution of applications on wireless computing devices.

Processing engine 60 includes various processing subsystems 66 embodied in hardware, firmware, software, and combinations thereof, that enable the functionality of communication device 12 and the operability of the communication device on a wireless or wired network. For example, processing subsystems 66 allow for initiating and maintaining communications, and exchanging data, with other networked devices. In one aspect, such as in a cellular telephone, communications processing engine 62 may include one or a combination of processing subsystems 66, such as: sound, non-volatile memory, file system, transmit, receive, searcher, layer 1, layer 2, layer 3, main control, remote procedure, handset, power management, diagnostic, digital signal processor, vocoder, messaging, call manager, Bluetooth® system, Bluetooth® LPOS, position determination, position engine, user interface, sleep, data services, security, authentication, USIM/SIM, voice services, graphics, USB, multimedia such as MPEG, GPRS, etc. For the disclosed aspects, processing subsystems 66 of processing engine 62 may include any subsystem components that interact with applications executing on computer platform 58. For example, processing subsystems 66 may include any subsystem components that receive data reads and data writes from API 64 on behalf of the GUI module 40 or support the call manager module 46.

The data registry 60 of computer platform 42 may further store a Graphical User Interface (GUI) module 30 that includes data entry logic 32 operable for entering a shared secret 22 and any related shared secret information 24 into communication device memory/data registry 60, such as personal information manager 34. The GUI module is typically operable to provide the user of the device a visual display of data entry fields for inputting the shared secret and any related shared secret information. In alternate aspects in which the shared secret 22 and/or related shared secret information 24 is electronically communicated to the device, the shared secret may be automatically entered into memory, obviating the need to invoke the GUI module 30 for shared secret entry. The personal information manager 34 that stores the shared secret 22 and the related shared secret information 24 may comprise a contact information database 68, such as a personal phonebook or the like. The contact information database stores personal information related to contacts, such as name, telephone number and the like and associates the shared secret, and, optionally, related shared secret information, with a contact. In alternate aspects, the shared secret 22 and related shared information may be stored in other files or directories, within personal information manager 34 or elsewhere in the data registry 60, which provide for association between callers/contacts and shared secrets.

The data registry 60 of computer platform 42 further may include a call manager module 46 that may include shared secret recognition logic 48 operable for recognizing a shared secret 22 in a call request, verifying that the shared secret is associated with a caller/contact and performing the function or application associated with the shared secret or as prescribed by related shared secret information 24. Verifying that the shared secret is associated with a caller/contact may involve accessing the personal information manager 34 and verifying that a shared secret is associated with a caller/contact in the database. Once the shared secret has been verified, logic 48 may perform the function or application associated with the shared secret or the related shared information. For example, the shared secret may be associated with a custom caller-ID function, whereby the caller/contact identification associated with the shared secret is displayed or otherwise communicated as the caller in lieu of the calling device's identification. In other examples, the shared secret may be associated with a device function, such as disabling the device or otherwise locking-down the device to prevent unauthorized use of a lost or stolen device.

The call manager module 46 may further include trigger recognition logic 50 operable for recognizing a trigger 70 in a call request. The trigger 70 may be numeric code or the like that notifies the call control manager that a shared secret is appended in the call request. In some aspects, the trigger 70 may indicate the function or application to which the shared secret is associated with. For example, a trigger having a numeric value of "88" may indicate that custom caller ID functionality is associated with the appended shared secret, while a trigger having a numeric value of "89" may indicate that call priority tagging, such as displaying or otherwise communicating an "urgent" message with the call indicator signal, is associated with the appended shared secret. In such aspects, the personal information manager 34 or another device database may store data that associates the triggers 70 with the shared secrets 22 and the optional related shared secret information 24.

In one aspect in which the shared secret is associated with caller identification functionality, the call manager module 46 may include caller ID logic 52. Caller ID logic may be operable to provide a display or otherwise communicate caller identification, such as name, telephone number and the like. Conventional caller ID logic provides for the display or other communication of the identification, typically a name or telephone number, associated with the calling device. In present aspects, however, the caller ID logic may be configured such that recognition of a shared secret provides for display or other communication of the contact/caller associated with the shared secret in lieu of the display or communication of the identification associated with the calling device. Additional information, typically stored in the related shared secret information, may also be displayed or otherwise communicated, such as call priority or the like. As such, the calling party who is calling from a device other than a device that is typically associated with the calling party (for example, a borrowed device), can insure that their identification information is displayed or otherwise communicated to the called party, rather than the actual owner information, to increase the likelihood that the called party answers or otherwise acknowledges the call. In alternate aspects, in which the shared secret recognition and association is conducted at the network device the caller ID logic 52 may be operable to recognize caller ID information in the call request payload and display or otherwise output the caller ID information.

In other aspects in which the shared secret is associated with remote access and/or device management functionality, the call manager module 46 may include remote access/device management logic 61. In aspects in which shared secret recognition and association is conducted at the called communication device, remote access/device management logic 61 may be operable to recognize a trigger or shared secret associated with a remote access function or device management function and perform the remote access or device management. In alternate aspects in which the shared secret recognition and association is conducted at the network device, remote access/device management logic 61 may be operable to recognize a remote access/device management code in the call request and perform a function associated with the code or the remote access/device management logic 61 may be operable to execute instructions in the call request to perform requisite remote access/device management functions.

The computer platform 58 may further include a communications module 72 embodied in hardware, firmware, software, and combinations thereof, that enables communications among the various components of the communication device 12, as well as between the device 12 and a wired or wireless network. The communication module may include the requisite hardware, firmware, software and/or combinations thereof for establishing a wired or wireless communication connection.

Figure 4:
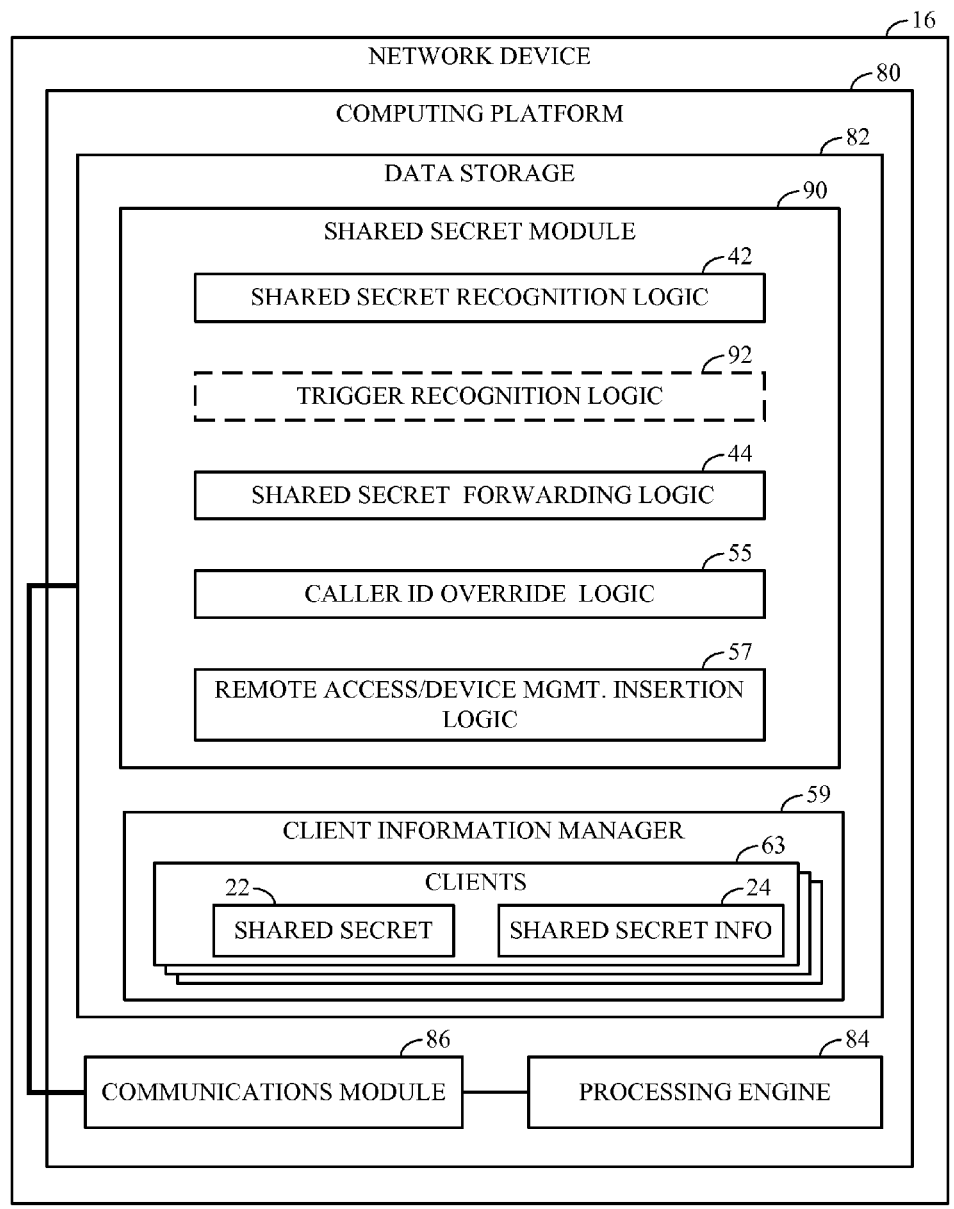
FIG. 4 is a block diagram of one aspect of a network device for providing customized caller identification and/or remote communication device access.

Referring to FIG. 4, in one aspect, a block diagram depiction of a network device 16 operable for recognizing shared secrets, associating the shared secrets with a caller or function and/or forwarding call requests is presented. The network device may comprise at least one of any type of hardware, server, personal computer, mini computer, mainframe computer, or any computing device either special purpose or general computing device. Further, the modules and applications described herein as being operated on or executed by the network device 16 may be executed entirely on the network device 16 or alternatively, in other aspects, separate servers or computer devices may work in concert to provide data in usable formats to parties, and/or to provide a separate layer of control in the data flow between the wireless device 12 and the modules and applications executed by network device 16.

The network device 16 may include computer platform 80 that can transmit and receive data across a wireless or wired network, and that can execute routines and applications. Computer platform 80 may include a data storage 82, which may comprise volatile and nonvolatile memory such as read-only and/or random-access memory (RAM and ROM), EPROM, EEPROM, flash cards, or any memory common to computer platforms. Further, data storage 82 may include one or more flash memory cells, or may be any secondary or tertiary storage device, such as magnetic media, optical media, tape, or soft or hard disk. Further, computer platform 80 also may include a processing engine 84, which may be an application-specific integrated circuit ("ASIC"), or other chipset, processor, logic circuit, or other data processing device. The computer platform 80 may further include a communications module 86 embodied in hardware, firmware, software, and combinations thereof, that enables communications among the various components of the network device 16, as well as between the network device 16 and a wireless or wired network. For example, in the described aspects, the communication module is configured to receive call requests from calling party wireless devices and forward the call requests to called party wireless devices. The communication module may include the requisite hardware, firmware, software and/or combinations thereof for establishing a wireless communication connection.

The data storage 82 may include a shared secret module 90 that may implement shared secret recognition logic 42. In aspects in which shared secret recognition and association is performed at the called communication device, the shared secret recognition logic 42 may be operable for recognizing one or more shared secrets in a call request and parsing the payload that includes the shared secrets 22. Additionally, in such aspects, the call request may include a trigger and, thus, the data storage 82 may include trigger recognition logic 92 operable for recognizing one or more triggers in a call request and parsing the payload that includes the trigger(s) and the associated shared secret(s). Additionally, in aspects in which the shared secret recognition and association is performed at the called communication device, the network device also may include shared secret forwarding logic 44 that is operable for forwarding the parsed payload that includes the shared secret and, optional trigger, to the called party as part of the call request.

In alternate aspects, in which shared secret recognition and association is performed at the network device, the shared secret recognition logic 42 may be operable to recognize the shared secret, verify the existence of the shared secret in device database, such as the shared secret 22 in client information manager 59 and, upon verification, perform the function or execute the application related to the shared secret. The client information manager is a database stored within the network device 16 or stored at any other network location that is accessible to the network device. The client information manager is a database of client/user information 63 and may specifically include shared secret 22 and any related shared secret information 24 associated with each client/user in the database.

In certain aspects, in which shared secret recognition and association is performed at the network device and the function related to the shared secret is customized caller ID, the shared secret module 90 may include caller ID override logic 55. The caller ID override logic 55 is operable to replace, in the payload of the call request, the calling device (i.e., second communication device 14) caller ID information with caller ID information associated with the shared secret owner (i.e., the actual calling party). The caller ID information associated with the shared secret 22 may be retrieved from the client information manager 59.

In alternate aspects, in which shared secret recognition and association is performed at the network device and the function related to the shared secret pertains to remote access, communication device management or the like, the shared secret module 90 may include remote access/device management insertion logic 57. The remote access/device management insertion logic 57 is operable for inserting within the call request payload identification and/or instructions for remote access, communication device management or the like. In certain aspects, the insertion logic 57 may insert an identification, such as code, within the payload that will be recognizable by the first communication device 12 (i.e., the called party) and associated with the requisite remote access, communication device management or the like. In alternate aspects, the insertion logic 57 may insert instructions, such as a routine, applications, applet or the like, within the payload that will be executed by the first communication device 12 to perform the requisite remote access, communication device management or the like.

FIGS. 5, 6, 7 and 8 provide examples of GUI displays for phonebook or contact listing data entry, specifically entry of a shared secret for an associated contact listing. It is noted that the GUI displays shown in FIGS. 5-8 are by way of example only and, as such, various other user interface implementations, graphical, audible or otherwise, can be adopted by the manufacturer of the communication device to accomplish the tasks herein described, as well as, assimilate the overall user experience flow with predefined device user interfaces. FIG. 5 provides a display 100 of contacts 102A-102F listed in personal phonebook or contact listing database. In the illustrated aspect, a user of the GUI desires to enter a shared secret that is associated with contact name "Davis" 102C. The user may select the "Davis" contact 102C by engaging a keypad key or another predetermined device input mechanism. Selection of the "Davis" contact 102C may result in a display of personal information related to the contact, such as depicted in FIG. 6. Shown in FIG. 6, the display 110 of the personal information may include one or any combination of data fields such as contact name 112, contact home telephone number 114, contact cellular telephone number 116, contact email address 118, contact home address 120 and contact shared secret 122. The blank data entry field 124 associated with the shared secret 122 indicates that the contact does not currently have an associated shared secret. The display 110 also includes an "edit" key 126 that is operable to be engaged by the user to provide editable data and/or data entry fields. In addition to engaging the "edit" key 126, a user may be prompted to enter a programming security code or some other form of authorization to be granted the right to add or edit personal information.

FIG. 7 provides a display 130 of editable data entry fields that may result from a user engaging the "edit" key 126 as shown in FIG. 6. A user may edit the previously entered data, such as the contact name 112, contact home telephone number 114, contact cellular telephone number 116, contact email address 118 and/or contact home address 120. In the illustrated depiction, the underlined data indicates data that is editable. As shown, the user has entered a shared secret "009999" in the entry field 124 for the shared secret 122. The data entry display 130 also includes a "save" key 132 that is operable to be engaged by the user to save the edit and/or entered data in the contact database. It should be noted that data entry logic 32 may be configured to provide for a displayable indication that the entered shared secret is already being used by another entry in the database. If the data entry logic provides for such indication, the data entry logic 32 may further be configured to provide for the user to override the previous assignment of the shared secret or provide for the selection of a different shared secret. FIG. 8 provides a display 140 of personal information that may result from a user entering a shared secret code. Once a shared secret code has been entered and saved in contact database memory, subsequent display of the personal information related to the contact may provide for the shared secret field 124 to indicate that a shared secret exists, such as by use of asterisks or some other generic symbol/character/numeric display, but is otherwise masked from actual display to provide further security to the shared secret. Actual display of the shared secret may be viewed by engaging the "edit" key 126, or some other access key, and entering a programming security code or some other form of authorization to view or edit the personal information.

FIGS. 9, 10, 11 and 12 provide examples of GUI displays for phonebook or contact listing data entry, specifically entry of a shared secret and related shared secret information for an associated contact listing. FIG. 9 provides a display 200 of contacts 202A-202F listed in personal phonebook or contact listing database. In the illustrated aspect, a user of the GUI desires to enter a shared secret that is associated with contact name "Davis" 202C. The user may select the "Davis" contact 202C by engaging a keypad key or another predetermined device input mechanism. Selection of the "Davis" contact 202C may result in a display of personal information related to the contact, such as depicted in FIG. 10. Shown in FIG. 10, the display 210 of the personal information may include one or any combination of data fields such as contact name 212, contact home telephone number 214, contact cellular telephone number 216, contact email address 218, contact home address 220, contact shared secret 222 and shared secret info 226. The blank data entry field 224 associated with the shared secret 222 and the blank data entry field 228 associated with shared secret info 226 indicates that the contact does not currently have an associated shared secret or related shared secret information. The display 210 also includes an "edit" key 230 that is operable to be engaged by the user to provide editable data and/or data entry fields. In addition to engaging the "edit" key 230, a user may be prompted to enter a programming security code, or some other form of authorization, to be granted the right to add or edit personal information.

FIG. 11 provides a display 240 of editable data entry fields that may result from a user engaging the "edit" key 230 as shown in FIG. 10. A user may edit the previously entered data, such as the contact name 212, contact home telephone number 214, contact cellular telephone number 216, contact email address 218 and/or contact home address 220. In the illustrated depiction the underlined data indicates data that is editable. As shown, the user has entered a shared secret "009999" in the entry field 224 for the shared secret 222 and related shared secret information "URGENT" in the entry field 228 for shared secret information 226. The data entry display 240 also includes a "save" key 242 that is operable to be engaged by the user to save the edit and/or entered data in the contact database. It is noted that in operation the related shared secret information may be displayed or otherwise communicated to the device user when the user receives a call request that includes the associated shared secret. In the above example, the shared secret information therefore comprises call priority information. It should be noted that shared secret information allows for the display or communication of any type of message, as triggered by the shared secret. Additionally, it should be noted that the related shared secret information further may include a graphic, an alphanumeric character, an executable program such as a video file or an audio file, etc., which may be displayed or communicated to the device user. In alternate aspects, the related shared secret information may only be displayed when an associated information trigger, which may be in addition to the shared secret trigger, is included in a received call request. In other alternate aspects, the personal information associated with a contact may provide for the entry of multiple shared secrets and/or multiple related shared secret information. In such aspects, a contact may have one shared secret that provides for the display of contact information, such as name and telephone number and another shared secret may provide for the display of contact information, such as name and telephone number and the display of the related shared secret information, such as call priority information or the like.

FIG. 12 provides a display 250 of personal information that may result from a user entering a shared secret code and related shared secret information. Once a shared secret code and has been entered and saved in contact database memory, subsequent display of the personal information related to the contact may provide for the shared secret field 224 to indicate that a shared secret exists, by use of asterisks or some other generic symbol display, but is otherwise masked from actual display to provide further security to the shared secret. Actual display of the shared secret can be viewed by engaging the "edit" key 230, or some other access key, and entering a programming security code or some other form of authorization to view or edit the personal information. In the illustrated aspect, the shared secret information field 228 provides for visible display of the shared secret information. In alternate aspects, the GUI module may be configured to mask or otherwise conceal the data in shared secret information field 228.

FIGS. 13-16 provide GUI displays of caller ID information, in accordance with aspects discussed herein. FIG. 13 illustrates a GUI display 300 of caller ID information in which the received call request does not include a shared secret. In this instance, the caller ID logic may retrieve personal information from a phonebook or contact listing associated with the identification number, typically the telephone number, in the call request. The displayed information may include a call identifier 302 and caller ID information in the form of a calling device telephone number 304 and/or a calling party name 306. In the illustrated caller ID example, the calling party is calling from the communication device typically associated with and/or owned by and/or registered to the calling party, and therefore the calling party did not input a shared secret in the call request.

FIG. 14 illustrates a GUI display 310 of caller ID information in which the received call request includes a shared secret. In this instance, the caller ID logic, shared secret recognition logic or trigger recognition logic may recognize the shared secret or, optionally, the trigger in the call request, retrieves contact information associated with the shared secret and displays the contact information associated with the shared secret. The displayed information may include one or any combination of a call identifier 302 and caller ID information in the form of a calling device telephone number 304 and/or a calling party name 306. In this aspect, the calling device telephone number 304 reflects the number of the device being used to request the call, while the calling party number 306 reflects the actual name of the party placing the call (i.e., the party associated with the shared secret). In the illustrated caller ID example, the calling party is calling from a communication device other than the communication device typically associated with the calling party and, therefore, the calling party has inputted a shared secret and in the call request.

FIG. 15 illustrates a GUI display 320 of caller ID information in which the received call request includes a shared secret and the shared secret has associated shared secret information. In this instance, the caller ID logic, shared secret recognition logic or trigger recognition logic may recognize the shared secret or, optionally, the trigger in the call request, retrieves related shared secret information and displays the related shared secret information associated with the shared secret. The shared secret itself may provide for the display of the related shared secret information or, optionally, a trigger may provide for the display of the related shared secret information. The displayed information may include one or any combination of a call identifier 302, caller ID information in the form of a calling device telephone number 304 and a calling party name 306 and the related shared secret information 308. In this instance, the related shared secret information 308 is call priority tagging in the form of an "URGENT" message. In the illustrated caller ID example, the calling party is calling from the communication device typically associated with the calling party and, therefore, although a shared secret is not required to override the caller ID function, a shared secret and, optionally, a trigger has been inputted to provide for the inclusion of call priority tagging in the caller ID information.

FIG. 16 illustrates a GUI display 330 of caller ID information in which the received call request includes an unassociated shared secret. In this instance, the caller ID logic, shared secret recognition logic or trigger recognition logic may recognize the shared secret or, optional, trigger in the call request, and attempts to retrieve contact information associated with the shared secret. However, since the shared secret is not associated with any contact in the device database, the device displays a message within the caller ID information that notifies the device user that no match exists between the received shared secret and the contacts in the database. As such, the displayed information may include one or any combination of a call identifier 302 and caller ID information in the form of a calling device telephone number 304 and a "no match" message 332. Typically, the receipt of a call that includes an unassociated shared secret results from the calling party entering an incorrect telephone number or an incorrect shared secret.

FIG. 17 illustrates four examples of call request sequences that include shared secrets and, in some examples, optional triggers. The first example 350 illustrates a call request sequence that includes the telephone number of the called party and the shared secret. The calling party inputs the telephone number of the party to be called and, typically after a request delay period, inputs a shared secret code. As previously noted the shared secret may take the form of a numeric code or any other data attached to the call request that has secretly shared between the calling party and the called party may serve as the shared secret. In the second example 360, the call request sequence includes a telephone number of the called party, a trigger and a shared secret. The trigger provides for shared secret recognition within the calling network and at the called device and, optionally, the trigger may identify the function or application associated with the shared secret. For example, the trigger may involve engaging the "*" key on the keypad followed by a two or more digit numeric code. In aspects in which the trigger identifies the function or application associated with the shared secret, "*88" may be associated a customized caller ID function, "*89" may be associated with a call priority tagging function and the like.

The third example 370 illustrates a call request sequence that implements the use of multiple unique triggers to provide shared secret recognition and, in some aspects, identify the function or application associated with the shared secret. In the third example 370 the call request sequence includes a telephone number of the called party and multiple unique triggers with each trigger followed by the shared secret. In this example each trigger is identified with a unique device function or application. For example, entering a first trigger "*88" followed by the user's shared secret "009999" may provide for customized caller ID functionality, entering a second trigger "*89" followed by the user's shared secret "009999" may provide for call priority tagging, entering a third trigger "*90" followed by the user's shared secret "009999" may provide for an additional function or application to be launched on the called communication device. In this implementation, the calling party requires only one shared secret to perform multiple remote functions on the called device. The trigger codes may be stored on the calling device and accessible to the user through a GUI display.

The fourth example 380 illustrates a call request sequence that implement the use of a single trigger and multiple shared secrets; each shared secret being associated with a unique function or application on the called device. In the fourth example 380 the call request sequence includes a telephone number of the called party, a trigger and multiple unique shared secrets. For example, entering a trigger, such as "*88"

or the like notifies the network and the called device that the call request includes one or more shared secrets. The trigger is followed by multiple shared secrets, such as first shared secret "009999" associated with customized caller ID functionality, second shared secret "009998" associated with a call priority tagging functionality and a third shared secret "009997" associated with an additional function or application to be launched on the called communication device.

It should be noted that the examples of call sequences shown in FIG. 17 are not to be considered as limiting in any manner. Other call request sequences that include shared secrets and, optional triggers are also contemplated and are included within the concepts of the present aspects. As previously discussed, shared secrets and, optional, triggers are not limited to numerical codes entered on the calling device keypad during call request. Shared secrets may include any secret data shared between parties including, but not limited to, text data, audio data, visual data and the like. The trigger may include any input on the calling device that can be communicated along with the call request to notify the network and called device of a forthcoming shared secret.

Figure 18:
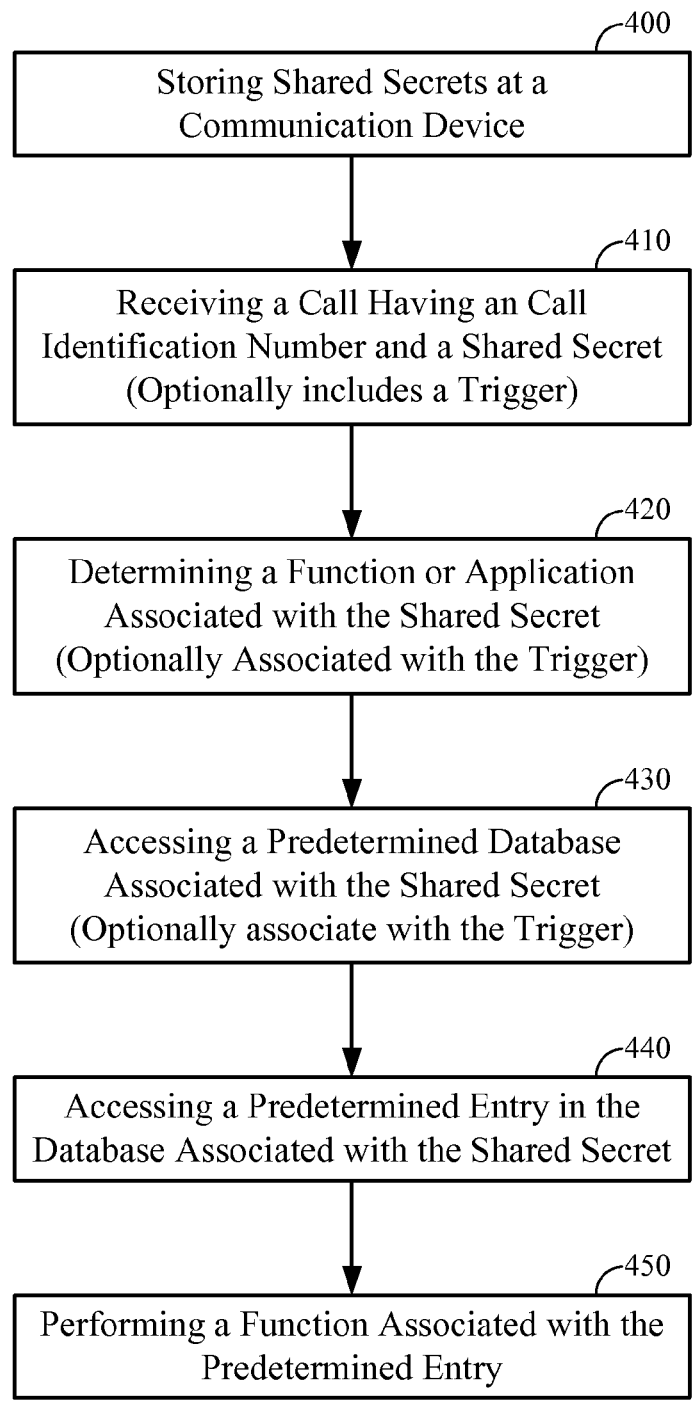
FIG. 18 is a flow diagram of one aspect of a communication device-based method for customized caller ID and/or remote functional management of a called communication device.

FIG. 18 is a flow diagram implementing a method for implementing client-based custom caller ID and/or remote functional management of a called communication device, in accordance with one aspect. At Event 400, shared secrets and, optional triggers and/or optional, related shared secret information are stored at a communication device. Shared secrets, triggers and related shared secret information may be manually inputted by the device user through implementation of an appropriate GUI module or the shared secrets, triggers and related shared secret information received via an electronic communication may be automatically entered and stored. As previously discussed, the shared secrets are typically associated and stored in relation to a contact or phone book entry. Thus, the shared secrets and, optional, triggers and/or, optional related shared secret information may be stored in a contact database, phone book or the like.

At Event 410, the communication device receives a call request that includes a call ID number, a shared secret and, optionally, a trigger. The trigger may serve to notify the communication device that the call request includes a shared secret. Additionally, a trigger may serve to identify the function or application associated with the shared secret. At Event 420, the communication device may determine the function or application associated with the shared secret or, optionally, associated with the trigger. In some aspects, the use of shared secrets may be limited to one function and, therefore no determination of the function or application associated with the shared secret or, optional, trigger may be required. However, in alternate aspects in which the multiple functions or applications are associated with the use of shared secrets, the shared secret or trigger may provide information related to the function or application related to the shared secret. For example, numeric trigger codes may indicate the function of the shared secret.

At Event 430, the communication device accesses a database such as a contact listing database, personal phonebook database or the like to verify that the shared secret is associated with a contact or phonebook entry. At Event 440, once the shared secret has been verified, data in the contact listing or phonebook entry is accessed and retrieved in accordance with the determined function or application. For example, if customized caller ID functionality is associated with the shared secret or trigger, the name or other personal information related to the contact is retrieved for subsequent display on the communication device. Alternatively, if call priority tagging is associated with the shared secret or trigger, information related to the shared secret, such as the priority tag, "urgent" or the like", is retrieved for subsequent display on the communication device. In alternate aspects, the communication device may be configured to determine the function or application associated with the shared secret or trigger once the device accesses the database and determines any related shared secret information.

Figure 19:
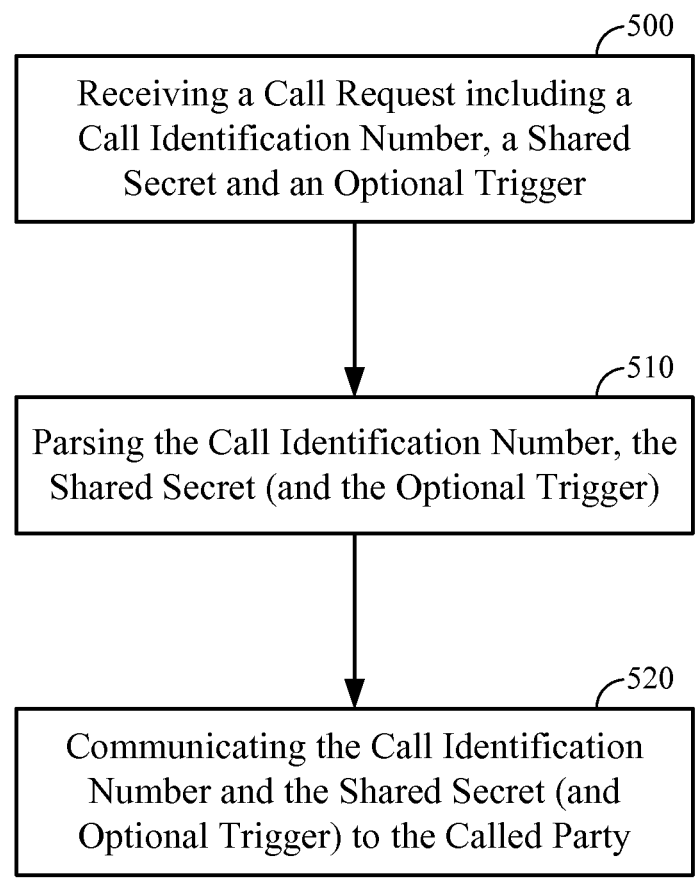
FIG. 19 is a flow diagram of one aspect of a method for shared secret and, optionally, trigger recognition and forwarding at a network device.

FIG. 19 provides a method for shared secret and, optionally, trigger recognition and forwarding at a network device. At Event 500, a network device receives a call request that includes a caller ID number, a shared secret and, optionally, a trigger. At Event 510, the network device parses the shared secret and, optionally, may parse the optional trigger. Parsing and subsequent inclusion of the optional trigger may be necessary if the trigger serves to notify the called device of a shared secret or if the trigger serves to identify the function or application associated with the shared secret. At Event 520, a call request is forwarded to the called device that includes the parsed data, i.e., the caller ID number, the shared secret and, optionally, the trigger.

Figure 20:
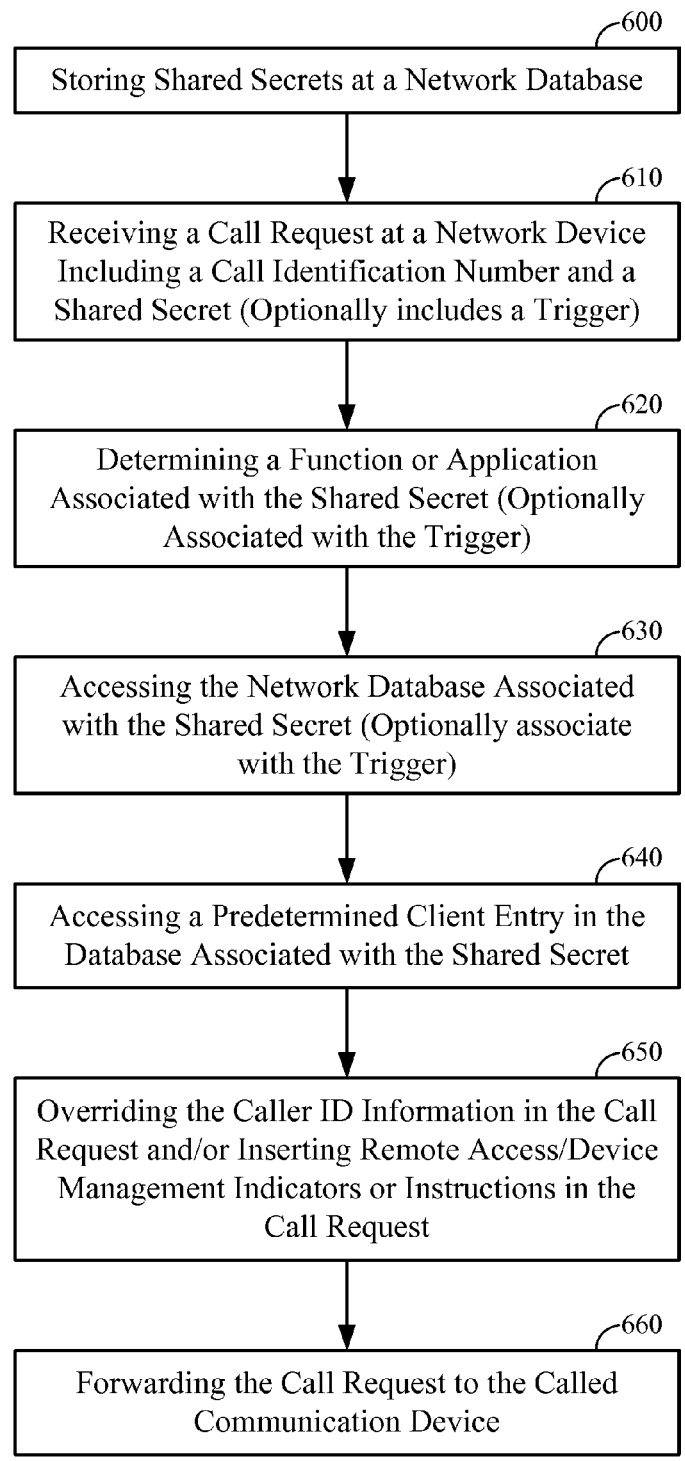
FIG. 20 is a flow diagram of network device-based method for customized caller ID and/or remote functional management of a called communication device.

FIG. 20 provides a flow diagram for a method for network-based custom caller ID and/or remote functional management of a called communication device, in accordance with one aspect. At Event 600, shared secrets and, optional triggers and/or optional, related shared secret information are stored at a network database, such as a client database. Shared secrets, triggers and related shared secret information may be communicated to the network database by the shared secret holder or it may be communicated to the network by a party to which the shared secret is being trusted/shared. In one aspect, the shared secrets, triggers and any related information may be stored in a client database that provides for individual entries for each client in the network. The client database may be stored in the same device that subsequently receives the call requests or at any other network location that is accessible to call request-receiving network device.

At Event 610, the network device receives a call request that includes a call ID number, a shared secret and, optionally, a trigger. The trigger may serve to notify the network device that the call request includes a shared secret. Additionally, a trigger may serve to identify the function or application associated with the shared secret. At Event 620, the communication device may determine the function or application associated with the shared secret or, optionally, associated with the trigger. In some aspects, the use of shared secrets may be limited to one function and, therefore no determination of the function or application associated with the shared secret or, optional, trigger may be required. However, in alternate aspects in which the multiple functions or applications are associated with the use of shared secrets, the shared secret or trigger may provide information related to the function or application related to the shared secret. For example, numeric trigger codes may indicate the function of the shared secret.

At Event 630, the communication device accesses a network database, such as a client database or the like to verify that the shared secret is associated with a contact or phonebook entry. At Event 640, once the shared secret has been verified, data in the client entry is accessed and retrieved in accordance with the determined function or application. For example, if customized caller ID functionality is associated with the shared secret or trigger, the name or other personal information related to the client is retrieved for subsequent communication to the communication device. Alternatively, if call priority tagging is associated with the shared secret or trigger, information related to the shared secret, such as the priority tag, "urgent" or the like", is retrieved for subsequent display on the communication device. In alternate aspects, the network device may be configured to determine the function or application associated with the shared secret or trigger once the device accesses the database and determines any related shared secret information.

At Event 650, if the function to be performed is customized caller ID, the network device will override the caller ID information on the call request with the caller ID information retrieved from the client database and associated with the shared secret. Additionally, if the function to be performed is remote access/device management related, the network device may insert remote access/device management identifiers, such as codes or the like, in the call request payload or insert instructions, such as applications, routines, applets or the like in the payload of the call request. At Event 660, the call request, which includes the customized caller ID information and or remote access/device management identifiers or instructions, is forwarded to the called communication device.

Thus, the describe aspects provide methods, devices, systems and computer program products for customizing caller ID or performing remote management of device functionality by implementing shared secret exchange between calling and called parties. Customized caller ID provides for a calling party to identify themself regardless of the device they are using to place to call. In addition, another function, such as call priority tagging provides for the calling party to prioritize the call or otherwise customize a call identification message to the called party. By exchanging shared secrets amongst the calling and called parties the customized caller ID and remote functional management method is secure; eliminating the likelihood of unauthorized tampering by unknown parties. Shared secret exchange also provides for authorized callers to remotely access and manage the communication device, such as, for example remotely locking down the communication device in an off state.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the actions of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While the foregoing disclosure shows illustrative aspects and/or embodiments, it should be noted that various changes and modifications could be made herein without departing from the scope of the described aspects and/or embodiments as defined by the appended claims. Furthermore, although elements of the described embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

Thus, many modifications and other embodiments of the invention may come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for operating a mobile communication device, comprising:
   receiving, at the mobile communication device, a wireless communication call including at least one notification trigger and at least one shared secret provided from a caller in conjunction with set-up of the wireless communication call;
   verifying, at the mobile communication device, the at least one shared secret by detecting whether the at least one shared secret is included among a set of multiple shared secrets that are each configured to launch a different mobile communication device function when received at the mobile communication device in association with the at least one notification trigger; and
   performing at least one mobile communication device function at the mobile communication device based on the at least one shared secret,
   wherein performing the at least one mobile communication device function includes providing, by the mobile communication device, a priority output signal to identify a priority of the wireless communication call, and
   wherein the mobile communication device corresponds to a called party of the wireless communication call.

2. The method of claim 1, wherein verifying the at least one shared secret further comprises referencing a database in response to receipt of the at least one shared secret and referencing an entry in the database associated with the at least one shared secret.

3. The method of claim 1, wherein performing the at least one mobile communication device function associated with the at least one shared secret further comprises providing a caller identifier output signal to identify the caller.

4. The method of claim 3, wherein providing the caller identifier output signal to identify the caller comprises displaying a caller identification to identify the caller.

5. The method of claim 3, wherein providing the caller identifier output signal to identify the caller comprises providing an audio signal to identify the caller.

6. The method of claim 1, wherein the priority output signal is displayed as a priority message to identify the priority of the wireless communication call.

7. The method of claim 1, wherein performing the at least one mobile communication device function associated with the at least one shared secret further comprises providing the caller with remote access to one or more remote management functions.

8. The method of claim 1, wherein performing the at least one mobile communication device function associated with the at least one shared secret further comprises locking the mobile communication device in an off mode.

9. The method of claim 1, wherein verifying the at least one shared secret further comprises referencing a database associated with the at least one notification trigger and referencing an entry in the database associated with the at least one shared secret.

10. A non-transitory computer readable medium tangibly storing a sequence of instructions that, when executed, cause a mobile communication device to perform actions, the actions comprising:
receiving, at the mobile communication device, a wireless communication call including at least one notification trigger and at least one shared secret provided from a caller in conjunction with set-up of the wireless communication call;
verifying the at least one shared secret by detecting whether the at least one shared secret is included among a set of multiple shared secrets that are each configured to launch a different mobile communication device function when received at the mobile communication device in association with the at least one notification trigger; and
performing at least one mobile communication device function based on the at least one shared secret,
wherein performing the at least one mobile communication device function includes providing, by the mobile communication device, a priority output signal to identify a priority of the wireless communication call,
wherein the mobile communication device corresponds to a called party of the wireless communication call.

11. At least one processor within a mobile communication device configured to perform actions, the actions comprising:
receiving a wireless communication call including at least one notification trigger and at least one shared secret provided from a caller in conjunction with set-up of the wireless communication call;
verifying the at least one shared secret by detecting whether the at least one shared secret is included among a set of multiple shared secrets that are each configured to launch a different mobile communication device function when received at the mobile communication device in association with the at least one notification trigger; and
performing at least one mobile communication device function based on the at least one shared secret,
wherein performing the at least one mobile communication device function includes providing, by the mobile communication device, a priority output signal to identify a priority of the wireless communication call, and
wherein the mobile communication device corresponds to a called party of the wireless communication call.

12. A mobile communication device, comprising:
means for receiving a wireless communication call including at least one notification trigger and at least one shared secret provided from a caller in conjunction with set-up of the wireless communication call;
means for verifying the at least one shared secret by detecting whether the at least one shared secret is included among a set of multiple shared secrets that are each configured to launch a different mobile communication device function when received at the mobile communication device in association with the at least one notification trigger; and
means for performing at least one mobile communication device function based on the at least one shared secret,
wherein performing the at least one mobile communication device function includes providing, by the mobile communication device, a priority output signal to identify a priority of the wireless communication call, and
wherein the mobile communication device corresponds to a called party of the wireless communication call.

13. A method for caller identification on a mobile communication device, comprising:
receiving, at the mobile communication device, a wireless communication call including at least one notification trigger and at least one shared secret provided from a caller in conjunction with set-up of the wireless communication call;
accessing, at the mobile communication device, one or more databases to determine a contact associated with the at least one shared secret and a communication priority associated with the at least one shared secret, wherein the communication priority is determined by detecting whether the at least one shared secret is included among a set of multiple shared secrets that are each configured to launch a different mobile communication device function when received at the mobile communication device in association with the at least one notification trigger; and
providing, at the mobile communication device, one or more output signals based on the at least one shared secret that identify the contact associated with the shared secret and the communication priority associated with the at least one shared secret,
wherein the mobile communication device corresponds to a called party of the wireless communication call.

14. The method of claim 13, wherein providing the one or more output signals further comprises displaying a caller identification associated with the contact associated with the at least one shared secret.

15. The method of claim 13, wherein providing the one or more output signals further comprises providing an audio signal associated with the contact associated with the at least one shared secret.

16. The method of claim 13, wherein the accessing accesses a given database associated with the at least one notification trigger to determine the contact.

17. The method of claim 13, wherein the one or more output signals identify the communication priority associated with the at least one shared secret by displaying a communication priority identifying message associated with the at least one shared secret.

18. The method of claim 13, wherein the one or more output signals identify the communication priority associated with the at least one shared secret by providing an audio signal that identifies the communication priority associated with the at least one shared secret.

19. A mobile communication device, comprising:
a personal information manager that includes one or more databases that associate shared secrets with shared secret information;
a call manager module including shared secret recognition logic operable to recognize at least one shared secret in a wireless communication call including at least one notification trigger provided from a caller in conjunction with set-up of the wireless communication call and the at least one shared secret by detecting whether the at least one shared secret is included among a set of multiple shared secrets that are each configured to launch a different mobile communication device function when received at the mobile communication device in association with the at least one notification trigger and shared secret function logic operable for performing at least one mobile communication device function based on the at least one shared secret, wherein performing the at least one mobile communication device function includes providing a priority output signal to identify a priority of the wireless communication call, wherein the mobile communication device corresponds to a called party of the wireless communication call.

20. The mobile communication device of claim 19, wherein the shared secret function logic further comprises caller identification logic operable to identify the caller and to provide an output signal to identify the caller.

21. The mobile communication device of claim 20, wherein the caller identification logic is further operable to display a caller identification to identify the caller.

22. The mobile communication device of claim 20, wherein the caller identification logic is further operable to provide an audio signal to identify the caller.

23. The mobile communication device of claim 19, wherein the shared secret function logic further comprises call priority logic operable to identify the priority of the wireless communication call based on the at least one shared secret and display the priority output signal as a priority message.

24. The mobile communication device of claim 19, wherein the shared secret function logic further comprises call priority logic operable to identify the priority of the wireless communication call based on the at least one shared secret and provide the priority output signal as an audio signal associated with the identified priority.

25. The mobile communication device of claim 19, wherein the shared secret function logic further comprises communication device management logic operable to provide the caller access to communication device functionality based on the at least one shared secret.

26. The mobile communication device of claim 19, wherein the shared secret function logic comprises communication device lock-down logic operable to lock down the mobile communication device based on the at least one shared secret.

27. A mobile communication device, comprising:
one or more databases that associate a contact with at least one shared secret; and
a call manager module including shared secret recognition logic operable to recognize at least one notification trigger and the at least one shared secret in a wireless communication call provided from a caller in conjunction with set-up of the wireless communication call and access the one or more databases to determine the contact associated with the at least one shared secret and a communication priority associated with the at least one shared secret by detecting whether the at least one shared secret is included among a set of multiple shared secrets that are each configured to launch a different mobile communication device function when received at the mobile communication device in association with the at least one notification trigger, and caller identification logic operable to provide one or more output signals based on the at least one shared secret that identify the contact associated with the at least one shared secret as the calling party and the communication priority associated with the at least one shared secret, wherein the mobile communication device corresponds to a called party of the wireless communication call.

28. The mobile communication device of claim 27, wherein the caller identification logic is further operable to display a caller identification associated with the contact associated with the at least one shared secret.

29. The mobile communication device of claim 28, wherein the caller identification logic is further operable to provide an audio signal that identifies the contact associated with the at least one shared secret.

30. A method for providing mobile communication device management at a network device, comprising:
receiving, at the network device, a wireless communication call request from a mobile calling party including a calling device identification number, at least one notification trigger and at least one shared secret; and
communicating a wireless call request to a mobile called party that includes the calling device identification number, the at least one notification trigger and the at least one shared secret,
wherein the at least one shared secret is configured to trigger the mobile called party to provide a priority output signal to identify a priority of the wireless communication call request based on the at least one shared secret being included among a set of multiple shared secrets that are each configured to launch a different mobile communication device function when received at the mobile called party in association with the at least one notification trigger.

31. The method of claim 30, wherein the mobile called party receives the call request, verifies the at least one shared secret and provides the priority output signal based on the at least one shared secret.

32. A non-transitory computer readable medium tangibly storing a sequence of instructions that, when executed, cause a network device to perform actions, the actions comprising:
receiving, at the network device, a wireless communication call request from a mobile calling party including a calling device identification number, at least one notification trigger and at least one shared secret; and
communicating a call request to a mobile called party that includes the calling device identification number, the at least one notification trigger and the at least one shared secret,
wherein the at least one shared secret is configured to trigger the mobile called party to provide a priority output signal to identify a priority of the wireless communication call request based on the at least one shared secret being included among a set of multiple shared secrets that are each configured to launch a different mobile communication device function when received at the mobile called party in association with the at least one notification trigger.

33. At least one processor configured to perform actions, the actions comprising:
receiving, at a network device, a wireless communication call request from a mobile calling party including a calling device identification number and a shared secret; and
communicating a call request to a mobile called party that includes the calling device identification number, at least one notification trigger and at least one shared secret,
wherein the at least one shared secret is configured to trigger the mobile called party to provide a priority output signal to identify a priority of the wireless communication call request based on the at least one shared secret being included among a set of multiple shared secrets that are each configured to launch a different mobile communication device function when received at the mobile called party in association with the at least one notification trigger.

34. A method for identifying a caller identification in a communication network, comprising:
   receiving, at a network server of the communication network that is remote from a mobile calling party and a mobile called party, a wireless communication call request from the mobile calling party to the mobile called party including at least one notification trigger, a calling device identification number, and at least one shared secret;
   referencing, by the network server, a client database to determine a caller identification associated with the at least one shared secret;
   referencing, by the network server, a database to determine a call priority to be outputted by the mobile called party and associated with the at least one shared secret by detecting whether the at least one shared secret is included among a set of multiple shared secrets that are each associated with different types of information associated with the wireless communication call request; and
   communicating, by the network server, a call request to the mobile called party that includes the call priority and the caller identification associated with the at least one shared secret,
   wherein the call request is configured by the network server to cause the mobile called party, in response to the call request being received at the mobile called party, to launch at least one of a plurality of different mobile communication device functions that is associated with the at least one shared secret.

35. A network device comprising a shared secret forwarding module that includes shared secret recognition logic operable for receiving a wireless communication call request from a mobile calling party including a calling device identification number, at least one notification trigger and at least one shared secret and shared secret forwarding logic operable to communicate a call request to a mobile called party that includes the calling device identification number, the at least one notification trigger and the at least one shared secret,
   wherein the at least one shared secret is configured to trigger the mobile called party to provide a priority output signal to identify a priority of the wireless communication call request based on the at least one shared secret being included among a set of multiple shared secrets that are each configured to launch a different mobile communication device function when received at the mobile called party in association with the at least one notification trigger.

36. A network server of a communication network that is remote from a mobile calling party and a mobile called party, comprising:
   a client database that associates shared secrets with caller identification;
   a shared secret module that is configured to receive a wireless communication call request from the calling party to the mobile called party including at least one notification trigger, a calling device identification number, and at least one shared secret and reference the client database to determine a caller identification associated with the at least one shared secret and further operable to reference a database to determine a call priority to be outputted by the mobile called party and associated with the at least one shared secret by detecting whether the at least one shared secret is included among a set of multiple shared secrets that are each associated with different types of information associated with the communication call request; and
   a communications module operable to communicate to the mobile called party the call request that includes the call priority and the caller identification associated with the at least one shared secret,
   wherein the call request is configured by the network server to cause the mobile called party, in response to the call request being received at the mobile called party, to launch at least one of a plurality of different mobile communication device functions that is associated with the at least one shared secret.

37. A network device, comprising:
   means for receiving a wireless communication call request from a mobile calling party including a calling device identification number, at least one notification trigger and at least one shared secret; and
   means for communicating a call request to a mobile called party that includes the calling device identification number, the at least one notification trigger and the at least one shared secret,
   wherein the at least one shared secret is configured to trigger the mobile called party to provide a priority output signal to identify a priority of the wireless communication call request based on the at least one shared secret being included among a set of multiple shared secrets that are each configured to launch a different mobile communication device function when received at the mobile called party in association with the at least one notification trigger.

38. A non-transitory computer readable medium tangibly storing a sequence of instructions that, when executed, cause a mobile communication device to perform actions, the actions comprising:
   receiving, at the mobile communication device, a wireless communication call including at least one notification trigger and at least one shared secret provided from a caller in conjunction with set-up of the wireless communication call;
   accessing one or more databases to determine a contact associated with the at least one shared secret and a communication priority associated with the at least one shared secret, wherein the communication priority is determined by detecting whether the at least one shared secret is included among a set of multiple shared secrets that are each configured to launch a different mobile communication device function when received at the mobile communication device in association with the at least one notification trigger; and
   providing one or more output signals based on the at least one shared secret that identify the contact associated with the shared secret and the communication priority associated with the at least one shared secret,
   wherein the mobile communication device corresponds to a called party of the wireless communication call.

39. The method of claim 3,
   wherein the caller identifier output signal is a customized caller identifier output signal for the caller.

40. The method of claim 1, wherein the shared secret includes visual data, audio data, biometric data and/or voice data that is configured to trigger the mobile communication device to provide the priority output signal.

41. The method of claim 1, wherein the at least one shared secret includes a single shared secret from the set of multiple shared secrets and the at least one notification trigger includes a single notification trigger.

42. The method of claim 1,
wherein the at least one notification trigger includes a single notification trigger and the at least one shared secret includes more than one shared secret from the set of multiple shared secrets, and
wherein each of the more than one shared secrets is associated with one of a plurality of different mobile communication device functions.

43. The method of claim 1,
wherein the at least one notification trigger includes multiple notification triggers and the at least one shared secret includes more than one shared secret from the set of multiple shared secrets,
wherein each notification trigger from the multiple notification triggers is paired with a corresponding shared secret from the more than one shared secret, and
wherein each notification trigger and shared secret pair is associated with one of a plurality of different mobile communication device functions.

44. The method of claim 34, wherein the plurality of different mobile communication device functions includes outputting the call priority.

* * * * *